(12) United States Patent
Watanabe

(10) Patent No.: US 11,983,412 B2
(45) Date of Patent: May 14, 2024

(54) MEMORY SYSTEM CONTROLLING NONVOLATILE MEMORY

(71) Applicant: Kioxia Corporation, Tokyo (JP)

(72) Inventor: Shuichi Watanabe, Fujisawa (JP)

(73) Assignee: Kioxia Corporation, Tokyo (JP)

( * ) Notice: Subject to any disclaimer, the term of this patent is extended or adjusted under 35 U.S.C. 154(b) by 295 days.

(21) Appl. No.: 17/585,845

(22) Filed: Jan. 27, 2022

(65) Prior Publication Data

US 2023/0043990 A1 Feb. 9, 2023

(30) Foreign Application Priority Data

Aug. 5, 2021 (JP) .................. 2021-129039

(51) Int. Cl.
*G06F 3/06* (2006.01)
(52) U.S. Cl.
CPC .......... *G06F 3/0613* (2013.01); *G06F 3/0653* (2013.01); *G06F 3/0659* (2013.01); *G06F 3/0679* (2013.01)
(58) Field of Classification Search
CPC .... G06F 3/0613; G06F 3/0653; G06F 3/0659; G06F 3/0679
See application file for complete search history.

(56) References Cited

U.S. PATENT DOCUMENTS

| 9,215,191 B2 | 12/2015 | Yamashita |
| 9,262,227 B2 | 2/2016 | Doi |
| 10,261,935 B1 | 4/2019 | Habusha et al. |

FOREIGN PATENT DOCUMENTS

JP 5958301 B2 7/2016

*Primary Examiner* — Charles Rones
*Assistant Examiner* — Han V Doan
(74) *Attorney, Agent, or Firm* — Oblon, McClelland, Maier & Neustadt, L.L.P.

(57) ABSTRACT

According to one embodiment, a controller of a memory system calculates an amount of transferred data per unit time in response to completion of processing of a first I/O command. While the calculated amount of transferred data per unit time exceeds a first threshold, the controller does not transmit, to a host, a completion response indicating completion of the first I/O command. When the calculated amount of transferred data per unit time is equal to or less than the first threshold, the controller transmits, to the host, the completion response indicating the completion of the first I/O command.

19 Claims, 15 Drawing Sheets

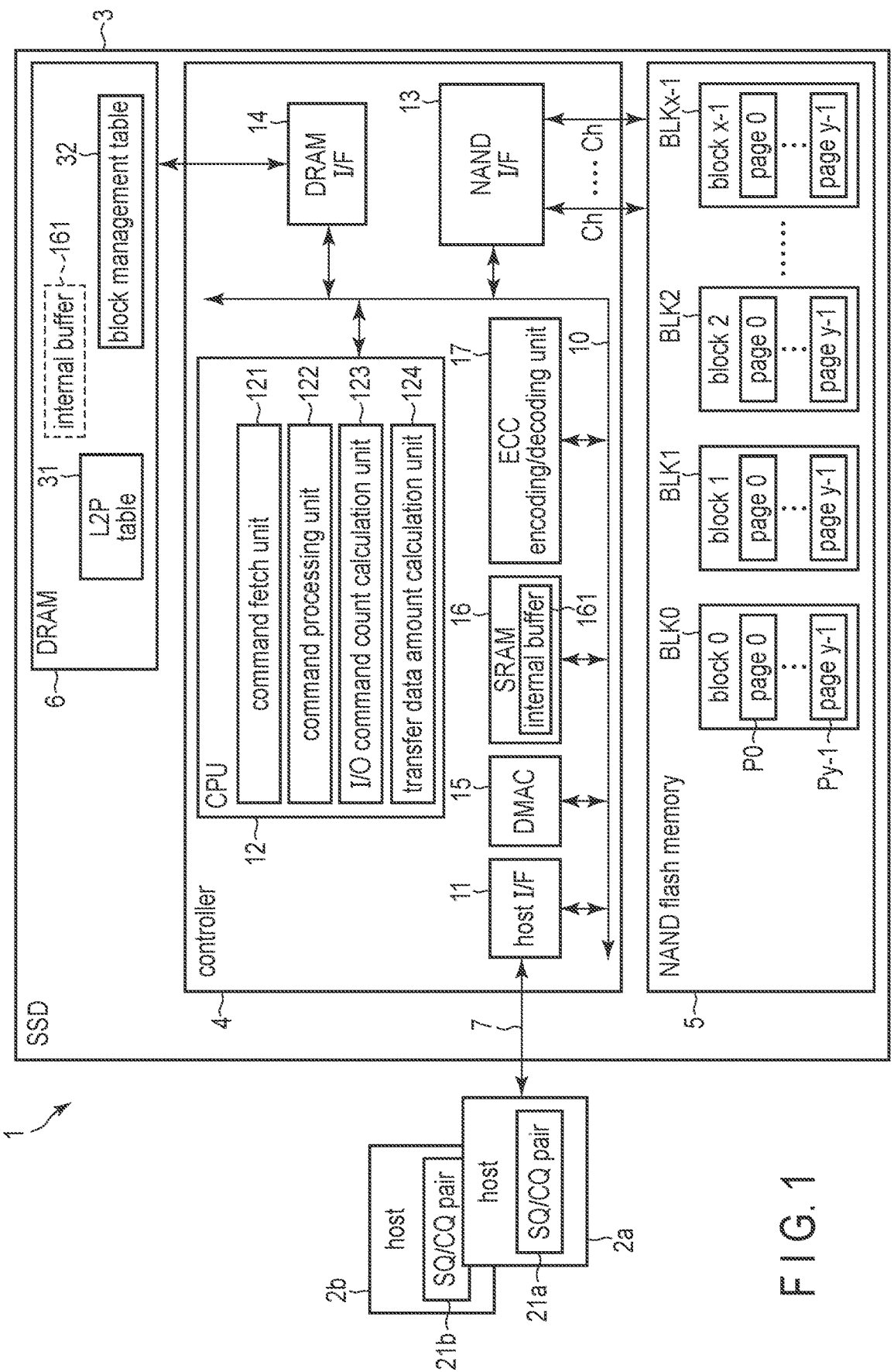
F I G. 1

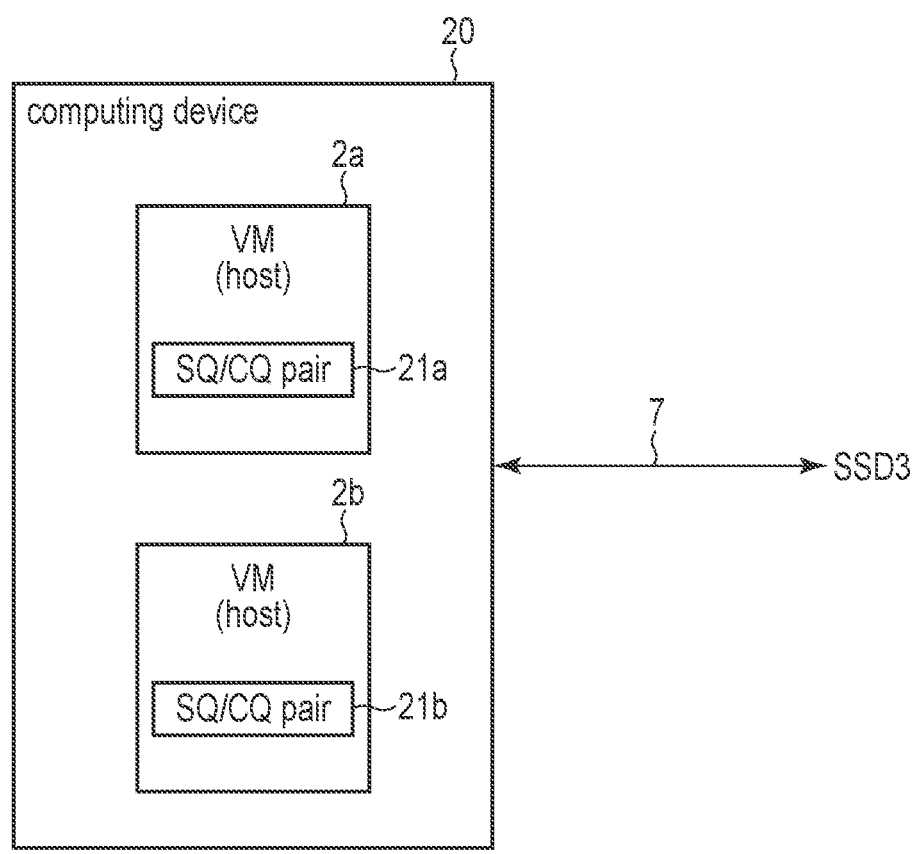
F I G. 2

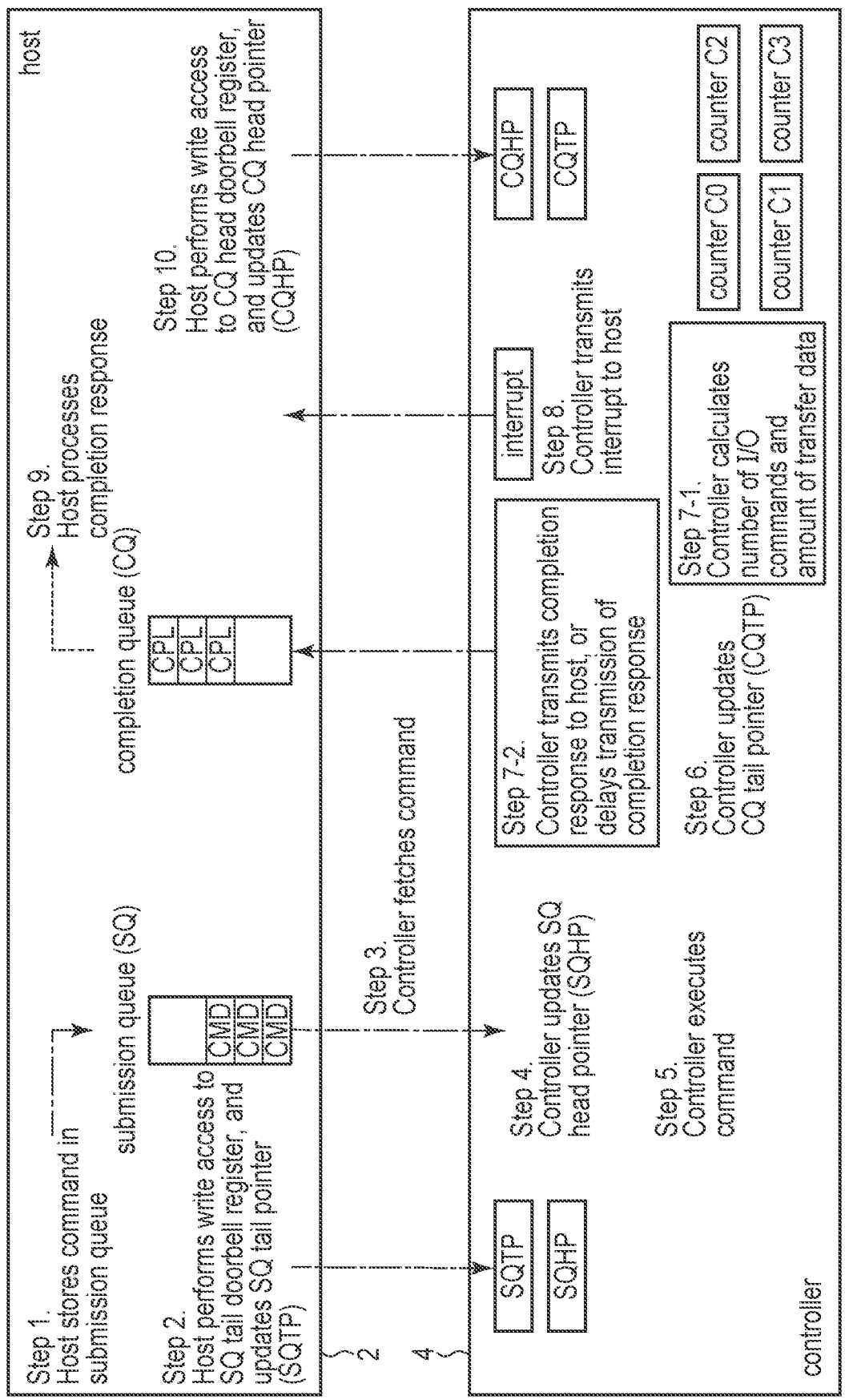
F I G. 6

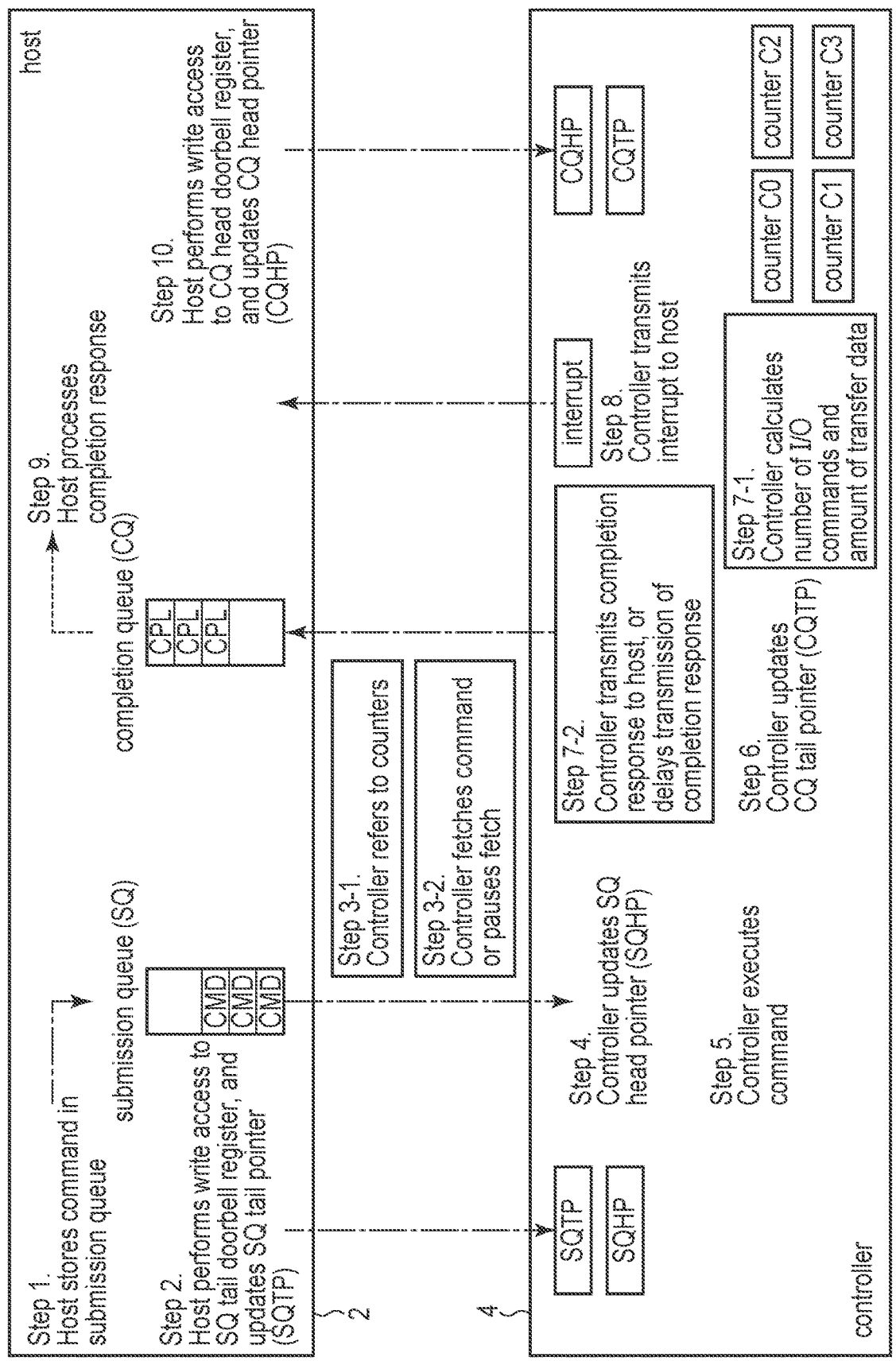
F I G. 7

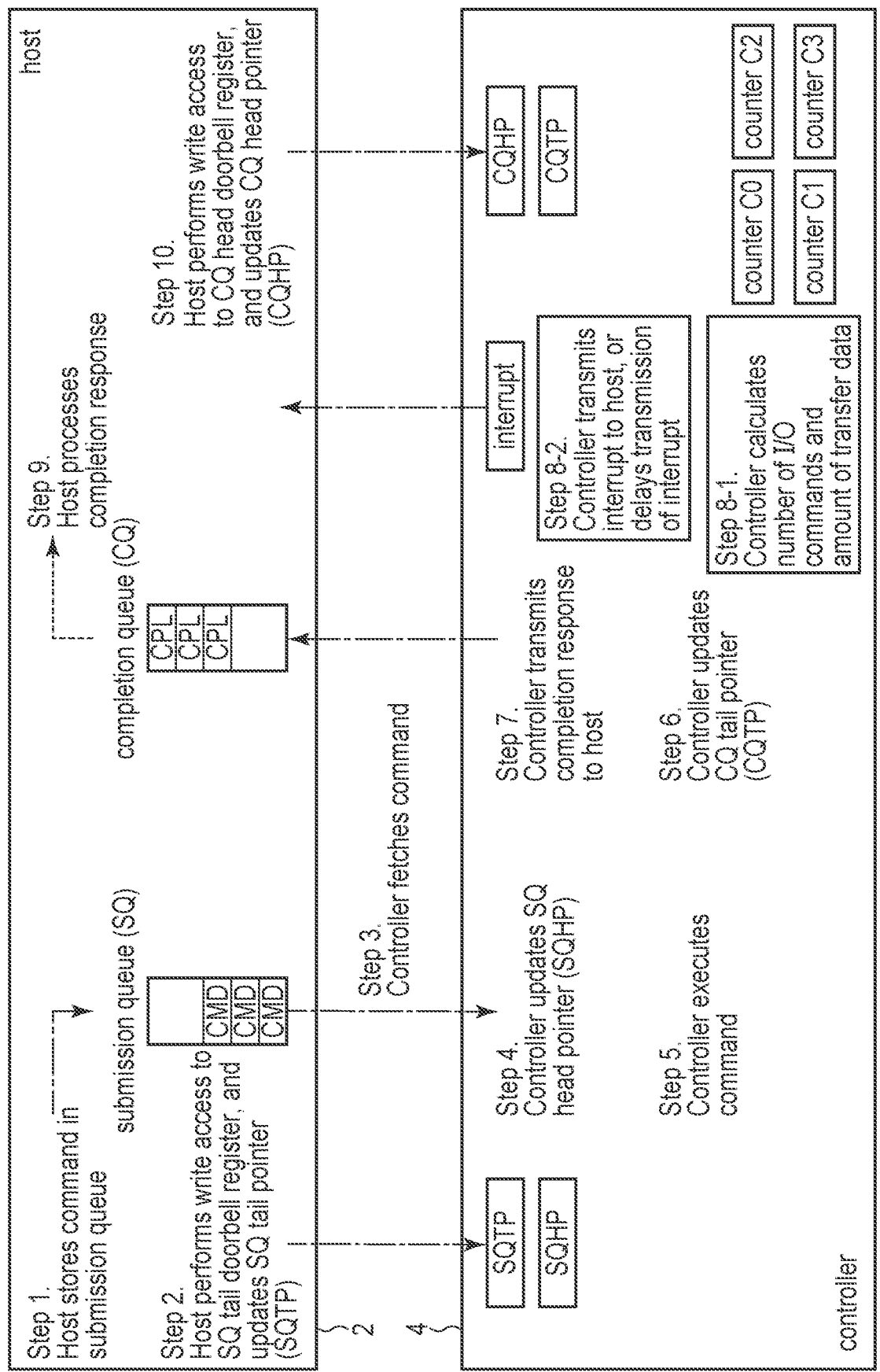
F I G. 8

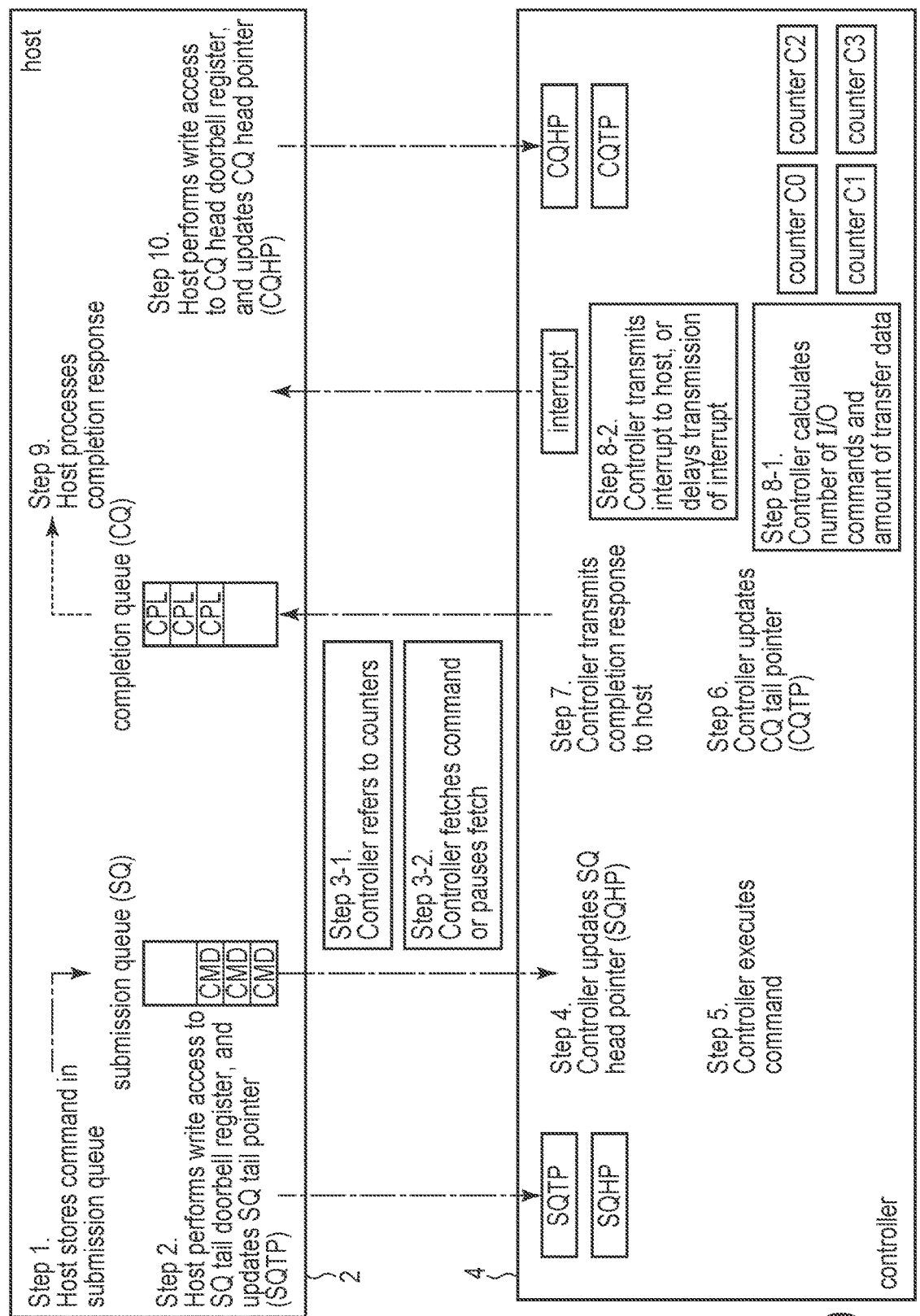
F I G. 9

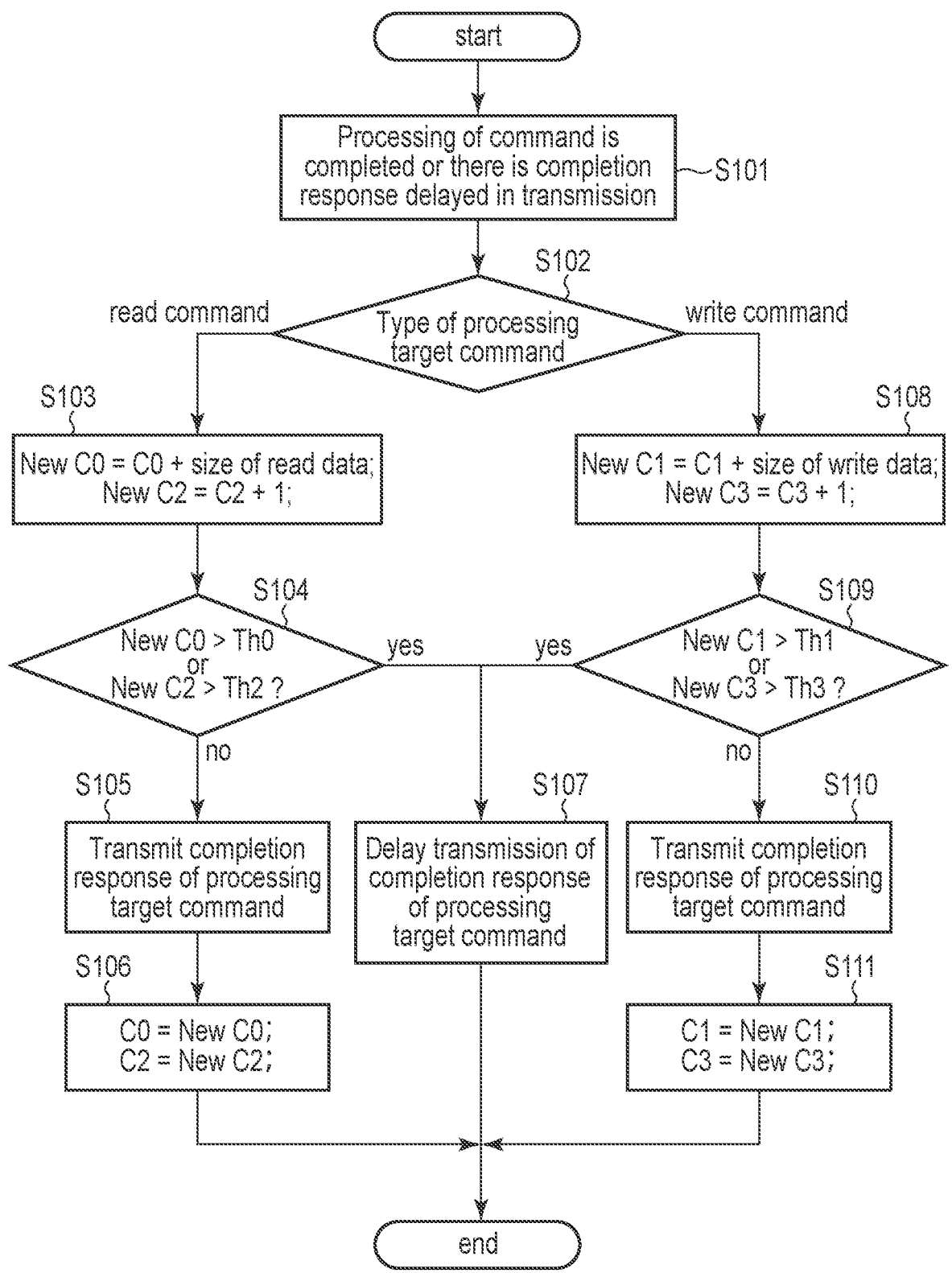
F I G. 12

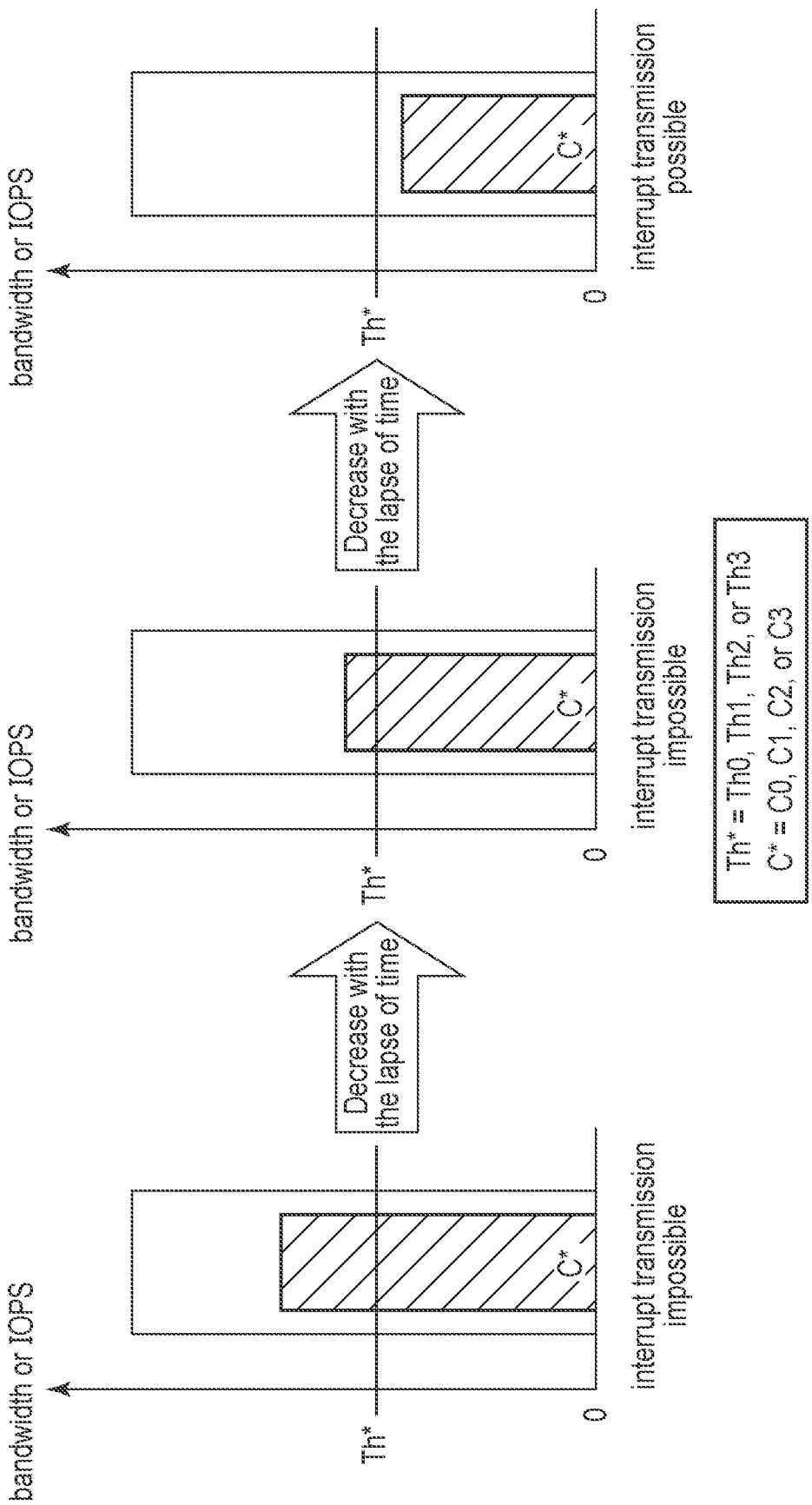
F I G. 14

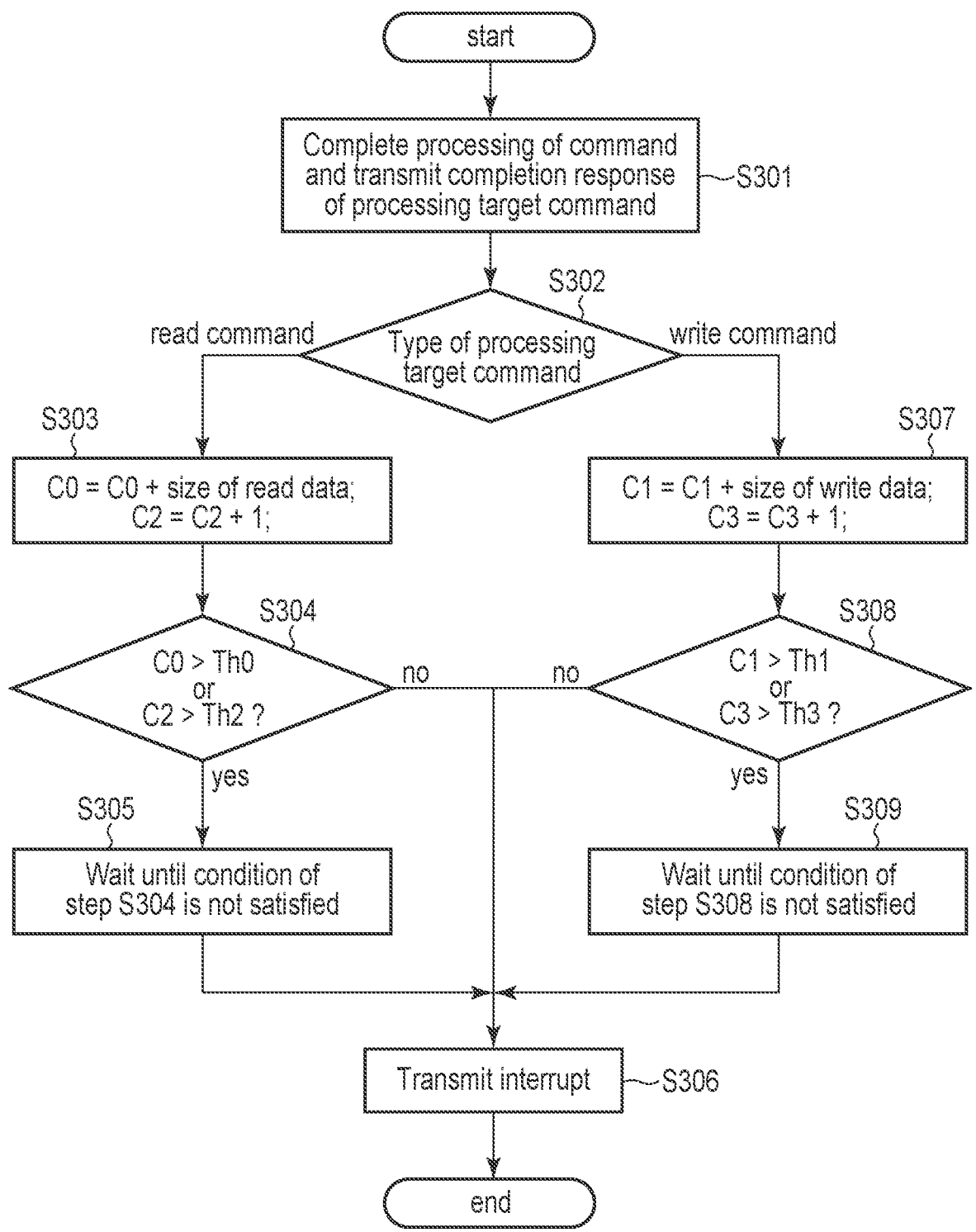
F I G. 15

MEMORY SYSTEM CONTROLLING NONVOLATILE MEMORY

CROSS-REFERENCE TO RELATED APPLICATIONS

This application is based upon and claims the benefit of priority from Japanese Patent Application No. 2021-129039, filed Aug. 5, 2021, the entire contents of which are incorporated herein by reference.

FIELD

Embodiments described herein relate generally to a technique for controlling a nonvolatile memory.

BACKGROUND

In recent years, a memory system implemented with a nonvolatile memory has been widely used. As one of such memory systems, a solid state drive (SSD) implemented with a NAND flash memory has been known.

In communication between a host and a memory system, the host issues I/O commands to the memory system. A controller included in the memory system processes each of the I/O commands received from the host. Then, when processing of a certain I/O command is completed, the controller transmits a completion response indicating completion of the I/O command to the host.

In the memory system, it is required to realize a new technique capable of controlling quality of service (QoS) regarding an I/O access performance that can be provided to the host.

BRIEF DESCRIPTION OF THE DRAWINGS

FIG. 1 is a block diagram illustrating an example of a configuration of an information processing system including a memory system according to an embodiment.

FIG. 2 is a block diagram illustrating an example of a configuration of a plurality of hosts sharing the memory system according to the embodiment.

FIG. 6 is a diagram illustrating a procedure of a command process including the completion response delay operation, which is executed in the memory system according to the embodiment.

FIG. 7 is a diagram illustrating a procedure of a command process including the completion response delay operation and the command fetch pause operation, which is executed in the memory system according to the embodiment.

FIG. 8 is a diagram illustrating a procedure of a command process including the interrupt delay operation, which is executed in the memory system according to the embodiment.

FIG. 9 is a diagram illustrating a procedure of a command process including the interrupt delay operation and the command fetch pause operation, which is executed in the memory system according to the embodiment.

FIG. 12 is a flowchart illustrating a procedure of the completion response delay operation executed in the memory system according to the embodiment.

FIG. 14 is a diagram illustrating a change in a counter value in the interrupt delay operation executed in the memory system according to the embodiment.

FIG. 15 is a flowchart illustrating a procedure of the interrupt delay operation executed in the memory system according to the embodiment.

DETAILED DESCRIPTION

Figure 3:
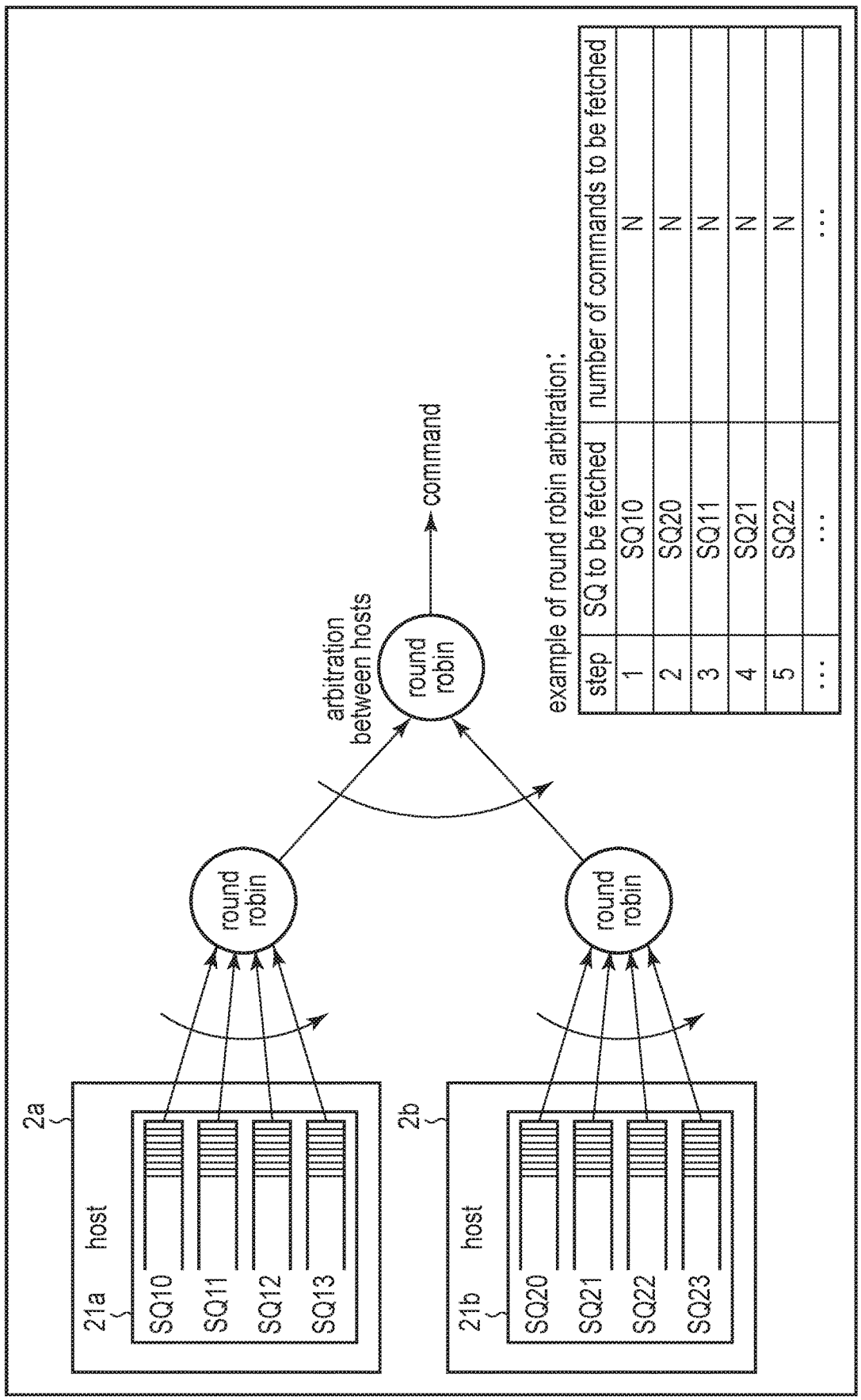
FIG. 3 is a diagram illustrating an arbitration operation executed in a memory system according to a comparative example.

Various embodiments will be described hereinafter with reference to the accompanying drawings.

In general, according to one embodiment, a memory system includes a nonvolatile memory and a controller electrically connected to the nonvolatile memory. The controller is configured to execute a data read operation or a data write operation for the nonvolatile memory by processing input/output (I/O) commands received from a host. In response to completion of processing of a first I/O command, the controller calculates an amount of transferred data per unit time. The amount of transferred data per unit time is an amount of data which are transferred between the host and the controller according to I/O commands processed per unit time. The I/O commands processed per unit time include the first I/O command. While the calculated amount of transferred data per unit time exceeds a first threshold, the controller does not transmit, to the host, a completion response indicating completion of the first I/O command. When the calculated amount of transferred data per unit time is equal to or less than the first threshold, the controller transmits, to the host, the completion response indicating the completion of the first I/O command.

Hereinafter, it is assumed that the memory system according to the embodiment is implemented as an SSD. FIG. 1 is a block diagram illustrating an example of a configuration of an information processing system 1 including the memory system according to the embodiment. The information processing system 1 includes one or more hosts (host devices) 2 and an SSD 3.

The host 2 is an information processing device (computing device) that accesses the SSD 3. The host 2 is, for example, a personal computer, a server computer, or a mobile terminal. FIG. 1 illustrates a case where two hosts 2, that is, a host 2*a* and a host 2*b* are provided in the information processing system 1.

The SSD 3 is a storage device connectable to the host 2. In a case where the information processing system 1 includes a plurality of hosts 2, the SSD 3 is shared by the plurality of hosts 2 of the information processing system 1. FIG. 1 illustrates a case where the SSD 3 is shared by the host 2a and the host 2b. Communication between the SSD 3 and the host 2a is executed through a bus 7. Similarly, communication between the SSD 3 and the host 2b is also executed through the bus 7.

The bus 7 is a transmission path that connects the host 2 and the SSD 3. The bus 7 is, for example, a PCI Express™ (PCIe™) bus. The PCIe bus is a full-duplex transmission path. The full-duplex transmission path includes both a transmission path for transmitting data from the host 2 to the SSD 3 and a transmission path for transmitting data from the SSD 3 to the host 2.

As a standard of a logical interface for connecting the host 2 and the SSD 3, for example, a NVM Express™ (NVMe™) standard can be used. In the interface of the NVMe standard, the communication between the host 2 and the SSD 3 is performed using a pair of queues including at least one submission queue (SQ) and a completion queue (CQ) associated with the at least one submission queue (SQ). This pair of queues is referred to as a submission/completion queue pair (SQ/CQ pair).

The submission queue (SQ) is a queue used to issue a command to the SSD 3. The completion queue (CQ) is a queue used to receive, from the SSD 3, a completion response indicating completion of a command.

Next, a configuration of each of the host 2a and the host 2b will be described.

The host 2a includes an SQ/CQ pair 21a for the host 2a. The SQ/CQ pair 21a is stored, for example, in a memory of the host 2a.

The host 2b includes an SQ/CQ pair 21b for the host 2b. The SQ/CQ pair 21b is stored, for example, in a memory of the host 2b.

In the communication between the host 2a and the SSD 3, issuing each command from the host 2a to the SSD 3 and transmitting of each command completion from the SSD 3 to the host 2a are executed using the SQ/CQ pair 21a. The command, the data (read/write data), and the completion response between the host 2a and the SSD 3 are transferred through the bus 7.

In the communication between the host 2b and the SSD 3, issuing each command from the host 2b to the SSD 3 and transmitting of each command completion from the SSD 3 to the host 2b are executed using the SQ/CQ pair 21b. The command, the data (read/write data), and the completion response between the host 2b and the SSD 3 is also transferred through the bus 7.

The communication between the host 2a and the SSD 3 and the communication between the host 2b and the SSD 3 use the same procedure. Therefore, hereinafter, the host 2a and the host 2b will be collectively referred to as the host 2 unless it is necessary to treat the host 2a and the host 2b separately.

Next, an internal configuration of the SSD 3 will be described. The SSD 3 includes a controller 4 and a non-volatile memory (for example, a NAND flash memory 5). The SSD 3 may also include a random access memory, for example, a dynamic random access memory (DRAM) 6.

The controller 4 is a memory controller that controls the NAND flash memory 5. The controller 4 is, for example, a control circuit such as a system-on-a-chip (SoC). The function of each unit of the controller 4 can be realized by dedicated hardware, a processor that executes a program, or a combination thereof. The controller 4 is electrically connected to the NAND flash memory 5. As a physical interface that connects the controller 4 and the NAND flash memory 5, for example, a Toggle NAND flash interface or an open NAND flash interface (ONFI) is used.

The controller 4 executes a data read operation or a data write operation for the NAND flash memory 5 by processing I/O commands received from the host 2. Each of the I/O commands is, for example, a read command or a write command. The read command is a command for reading data from the NAND flash memory 5. The write command is a command for writing data to the NAND flash memory 5.

The NAND flash memory 5 is a nonvolatile memory. The NAND flash memory 5 includes a memory cell array. The memory cell array includes a plurality of memory cells arranged in a matrix. The NAND flash memory 5 may be a flash memory having a two-dimensional structure or a flash memory having a three-dimensional structure.

The memory cell array of the NAND flash memory 5 includes a plurality of blocks BLK0 to BLKx−1. Each of the blocks BLK0 to BLKx−1 includes a plurality of pages (here, pages P0 to Py−1). Each page includes a plurality of memory cells connected to the same word line. Each of the blocks BLK0 to BLKx−1 is a unit for a data erase operation of erasing data. Each of the pages P0 to Py−1 is a unit for a data write operation and a data read operation.

The DRAM 6 is a volatile memory. A part of the memory area of the DRAM 6 is used to store, for example, a logical-to-physical address translation table (L2P table) 31 and a block management table 32. The L2P table 31 stores mapping information indicating mapping between each of logical addresses and each of physical addresses of the NAND flash memory 5. The block management table 32 stores information indicating the state of each of a plurality of blocks included in the NAND flash memory 5. The information indicating the state of each block includes, for example, information indicating the number of times of erasure for each block, information indicating whether each block is an active block or a free block, and the like.

Next, an internal configuration of the controller 4 will be described. The controller 4 includes a host interface (host I/F) 11, a CPU 12, a NAND interface (NAND I/F) 13, a DRAM interface (DRAM I/F) 14, a direct memory access controller (DMAC) 15, a static RAM (SRAM) 16, and an ECC encoding/decoding unit 17. The host interface 11, the CPU 12, the NAND interface 13, the DRAM interface 14, the DMAC 15, the SRAM 16, and the ECC encoding/decoding unit 17 are interconnected via a bus 10.

The host interface 11 is a host interface circuit that executes communication with the host 2. The host interface 11 is, for example, a PCIe controller. The host interface 11 includes an arbitration mechanism. This arbitration mechanism is a mechanism that selects a submission queue from which a command is to be fetched from a plurality of submission queues of the host 2. The arbitration mechanism is, for example, a round robin arbitration mechanism or a weighted round robin arbitration mechanism.

The CPU 12 is a processor. The CPU 12 controls the host interface 11, the NAND interface 13, the DRAM interface 14, the DMAC 15, the SRAM 16, and the ECC encoding/decoding unit 17. The CPU 12 loads a control program (firmware) stored in the NAND flash memory 5 or a ROM (not illustrated) into the DRAM 6, and executes the firmware to perform various processes. Note that the firmware may be loaded into the SRAM 16.

The CPU 12 performs management of data stored in the NAND flash memory 5 and management of blocks included in the NAND flash memory 5 as a flash translation layer (FTL). The management of data includes management of mapping information indicating a correspondence between each of the logical address and each of the physical address.

The logical address is an address used by the host 2 to access the SSD 3. The logical address is, for example, a logical block address (LBA). The physical address is an address indicating a physical storage location included in the NAND flash memory 5. The CPU 12 uses the L2P table 31 to manage the correspondence between each logical address and each physical address. Management of blocks of the NAND flash memory 5 includes management of defective blocks (bad blocks) of the NAND flash memory 5, wear leveling, and garbage collection.

The NAND interface 13 is a circuit that controls the NAND flash memory 5. When the NAND flash memory 5 includes a plurality of NAND flash memory chips (NAND flash memory dies), the NAND interface 13 may be connected to each of the NAND flash memory chips via a plurality of channels (Ch).

The DRAM interface 14 is a circuit that controls the DRAM 6.

The DMAC 15 is a circuit that executes direct memory access. The DMAC 15 executes data transfer between a memory provided in the host 2 and the SRAM 16 or the DRAM 6.

The SRAM 16 is a volatile memory. A part of the memory area of the SRAM 16 is used, for example, as an internal buffer 161. The internal buffer 161 is a memory area for temporarily storing data to be transferred between the host 2 and the controller 4. Note that the internal buffer 161 may be provided in a part of the memory area of the DRAM 6.

When data is to be written to the NAND flash memory 5, the ECC encoding/decoding unit 17 encodes the data to be written, thereby adding an error correction code (ECC) as a redundant code to the data. When data is read from the NAND flash memory 5, the ECC encoding/decoding unit 17 performs error correction of the data using the ECC added to the read data.

Next, a functional configuration of the CPU 12 will be described. The CPU 12 includes a command fetch unit 121, a command processing unit 122, an I/O command count calculation unit 123, and a transfer data amount calculation unit 124. A part or all of each of the command fetch unit 121, the command processing unit 122, the I/O command count calculation unit 123, and the transfer data amount calculation unit 124 may be realized by dedicated hardware in the controller 4. For example, the command fetch unit 121 may be realized by the host interface 11.

The command fetch unit 121 fetches I/O commands from a submission queue (SQ) of the host 2 via the host interface 11.

The command processing unit 122 interprets and executes each of the fetched I/O commands, and executes a data write operation or a data read operation for the NAND flash memory 5. Hereinafter, the data write operation is simply referred to as a write operation, and the data read operation is simply referred to as a read operation.

In addition, the command processing unit 122 transmits a completion response indicating completion of the I/O command to the host 2 via the host interface 11. In this case, the command processing unit 122 stores the completion response in a completion queue (CQ) associated with the submission queue (SQ) from which the I/O command is fetched.

The I/O command count calculation unit 123 calculates the number of I/O commands processed per unit time by the controller 4. The number of I/O commands processed per unit time is also referred to as input/output operations per second (IOPS). Every time processing of one I/O command is completed, the I/O command count calculation unit 123 calculates the number of I/O commands processed per unit time. In this case, the I/O command count calculation unit 123 calculates the number of I/O commands processed per unit time using, for example, a second counter value. The I/O command count calculation unit 123 manages the second counter value using, for example, a second counter (not illustrated). The second counter value indicates an accumulated value of the number of I/O commands completed per unit time. The number of I/O commands processed per unit time is calculated for each of the host 2a and the host 2b.

The transfer data amount calculation unit 124 calculates the amount of transfer data per unit time. The amount of transfer data per unit time is an amount of data transferred between the host 2 and the controller 4 according to the I/O commands processed per unit time. The amount of transfer data per unit time is also referred to as a bandwidth. The amount of transfer data per unit time is indicated, for example, in units of bytes/second. Every time the processing of one I/O command is completed, the transfer data amount calculation unit 124 calculates the amount of transfer data per unit time. In this case, the transfer data amount calculation unit 124 calculates the amount of transfer data per unit time using, for example, a first counter value. The transfer data amount calculation unit 124 manages the first counter value using, for example, a first counter (not illustrated). The first counter value indicates an accumulated value of a size of data (write data or read data) associated with each I/O command completed per unit time. The amount of transfer data per unit time is calculated for each of the host 2a and the host 2b.

Next, a process of controlling the quality of service regarding the I/O access performance that can be provided to the host 2 will be described. The command processing unit 122 manages two types of thresholds. The first threshold indicates an upper limit value of the amount of transfer data per unit time. In other words, the first threshold indicates an upper limit value of the bandwidth that can be provided to the host 2. The second threshold indicates an upper limit value of the number of I/O commands that can be processed per unit time. In other words, the second threshold indicates an upper limit value of IOPS that can be provided to the host 2. Each threshold can be set to any value based on the I/O access performance that can be provided to the host 2.

When processing of a certain I/O command received from the host 2 is completed, the I/O command count calculation unit 123 calculates the number of I/O commands processed per unit time. Accordingly, the latest IOPS is calculated in consideration of this I/O command competed.

Specifically, in a case where processing of a certain I/O command is completed, the I/O command count calculation unit 123 increments the second counter value by one. Accordingly, a value obtained by increasing the current value of the second counter by one is calculated as a new second counter value. The new second counter value is used for comparison with the second threshold.

Note that the second counter value is decremented by some algorithm. For example, the I/O command count calculation unit 123 decrements the second counter value by some value (second value) every time some time elapses, such that the sum of the values by which the second counter value is decremented per unit time becomes equal to the second threshold.

For example, in a case where the second threshold is 4M [IOPS], the time allowed for one I/O command is 250 ns. Therefore, the I/O command count calculation unit 123 decrements the second counter value by one every time 250 ns elapse. Alternatively, the I/O command count calculation unit 123 may decrement the second counter value by two every time 500 ns elapse. Alternatively, the I/O command count calculation unit 123 may decrement the second counter value by four every time 1000 ns elapse. As described above, the second counter value is decremented by the some value every time the some time shorter than the unit time elapses.

In addition, when processing of a certain I/O command received from the host 2 is completed, the transfer data amount calculation unit 124 calculates the amount of transfer data per unit time. Accordingly, the latest bandwidth in consideration of the size of data (read data or write data) associated with this I/O command is calculated.

Specifically, in a case where the processing of a certain I/O command is completed, the transfer data amount calculation unit 124 increments the first counter value by the size of the data corresponding to this I/O command. The size of the data corresponding to this I/O command is the size of the read data transferred from the controller 4 to the host 2 according to this I/O command or the size of the write data transferred from the host 2 to the controller 4 according to this I/O command. Accordingly, a value obtained by increasing the current value of the first counter by the size of the transferred data is calculated as a new first counter value. The new first counter value is used for comparison with the first threshold.

Note that the first counter value is decremented by some algorithms. For example, the transfer data amount calculation unit 124 decrements the first counter value by somevalue (first value) every time some time elapses, such that the sum of values by which the first counter value is decremented per unit time becomes equal to the first threshold.

In a case where processing of a certain I/O command is completed, the command processing unit 122 compares the new first counter value with the first threshold and then compares the new second counter value with the second threshold. Based on the comparison result, the command processing unit 122 determines whether each of the calculated number of I/O commands processed per unit time and the calculated amount of transfer data per unit time is equal to or less than the corresponding threshold. In a case where the calculated number of I/O commands processed per unit time is equal to or less than the second threshold and the calculated amount of transfer data per unit time is equal to or less than the first threshold, the command processing unit 122 transmits the completion response indicating completion of the I/O command to the host 2, that is, the command processing unit 122 stores the completion response in the completion queue.

On the other hand, while at least one of a condition that the calculated number of processed I/O commands per unit time exceeds the second threshold (that is, the calculated number of I/O commands processed per unit time is larger than the second threshold) or a condition that the calculated amount of transfer data per unit time exceeds the first threshold (that is, the calculated amount of transfer data per unit time is larger than the first threshold) is satisfied, the command processing unit 122 does not transmit the completion response indicating the completion of the I/O command to the host 2. That is, the command processing unit 122 does not transmit the completion response indicating the completion of the I/O command to the host 2 until both a condition that the calculated number of I/O commands processed per unit time is equal to or less than the second threshold and a condition that the calculated amount of transfer data per unit time is equal to or less than the first threshold are satisfied.

As described above, in this embodiment, in a case where the calculated number of I/O commands processed per unit time or the calculated amount of transfer data per unit time exceeds the corresponding threshold, the operation of delaying the timing of transmitting the completion response to the host 2 is executed.

Unless the completion response of the I/O command is transmitted from the controller 4 to the host 2, the host 2 cannot recognize that the processing of the I/O command is completed. Therefore, when the operation of delaying the timing of transmitting the completion response to the host 2 is executed, the host 2 recognizes that the time required for processing the I/O command takes longer. As a result, the host 2 determines that the host 2 cannot execute the I/O access according to the assumed schedule, and thus issuance of a new I/O command by the host 2 can be suppressed. Therefore, the operation of delaying the timing of transmitting the completion response to the host 2 makes it possible to adjust and control the quality of service regarding the I/O access performance that can be provided to the host 2 so that each of the number of I/O commands processed per unit time and the amount of transfer data per unit time does not exceed the corresponding threshold. For example, the operation of delaying the timing of transmitting the completion response to the host 2 can be individually executed for each of the host 2a and the host 2b. Therefore, it is possible to control so that the bandwidth of the bus 7 consumed by the processing of the I/O commands from the host 2a does not exceed the first and second thresholds corresponding to the host 2a, and further, it is possible to control so that the bandwidth of the bus 7 consumed by the processing of the I/O commands from the host 2b does not exceed the first and second thresholds corresponding to the host 2b. Therefore, it is possible to adjust and control the quality of service regarding the I/O access performance for each host sharing the SSD 3. Note that, instead of the operation of delaying the timing of transmitting the completion response to the host 2, the command processing unit 122 may perform an operation of delaying the timing of transmitting an interrupt for notifying the host 2 that a new completion response has been transmitted.

In this case, when processing of a certain I/O command is completed, the command processing unit 122 first transmits a completion response indicating completion of the I/O command to the host 2. That is, the command processing unit 122 stores the completion response in the completion queue. The I/O command count calculation unit 123 calculates the number of I/O commands processed per unit time using the second counter value. Accordingly, the latest IOPS is calculated in consideration of the certain I/O command. In addition, the transfer data amount calculation unit 124 calculates the amount of transfer data per unit time using the first counter value. Accordingly, the latest bandwidth in consideration of the size of data (read data or write data) associated with this I/O command is calculated.

In a case where the calculated number of I/O commands processed per unit time is equal to or less than the second threshold, and the calculated amount of transfer data per unit time is equal to or less than the first threshold, the command processing unit 122 transmits, to the host 2, an interrupt for notifying the host 2 that a new completion response has been stored in the completion queue.

On the other hand, while at least one of a condition that the calculated number of I/O commands processed per unit time exceeds the second threshold or a condition that the calculated amount of transfer data per unit time exceeds the first threshold is satisfied, the command processing unit 122 does not transmit, to the host 2, the interrupt for notifying the host 2 that a new completion response has been transmitted.

Even when the completion response of a certain I/O command is transmitted from the controller 4 to the host 2, unless an interrupt is transmitted to the host 2, the host 2 cannot recognize that the completion response is stored in the completion queue, and thus cannot recognize that the processing of this I/O command is completed. Therefore, when the operation of delaying the timing of transmitting the interrupt to the host 2 is executed, the host 2 recognizes that the time required for processing this I/O command takes longer. As a result, issuance of a new I/O command by the host 2 can be suppressed. Therefore, the operation of delaying the timing of transmitting the interrupt to the host 2 also enables adjustment and control of the quality of service regarding the I/O access performance that can be provided to the host 2. For example, the operation of delaying the timing of transmitting the interrupt to the host 2 can be individually executed for each of the host 2a and the host 2b. Therefore, it is possible to control so that the bandwidth of the bus 7 consumed by the processing of the I/O commands from the host 2a does not exceed the first and second thresholds corresponding to the host 2a, and further, it is possible to control so that the bandwidth of the bus 7 consumed by the processing of the I/O commands from the host 2b does not exceed the first and second thresholds corresponding to the host 2b. Therefore, it is possible to adjust and control the quality of service regarding the I/O access performance for each host sharing the SSD 3.

As described above, the operation of delaying the timing of transmitting the completion response or the interrupt to the host 2 can be individually executed for each of the host 2a and the host 2b. In this case, the number of I/O commands processed per unit time and the amount of transfer data per unit time are also individually calculated for each of the host 2a and the host 2b. The first threshold and the second threshold are individually set for each of the host 2a and the host 2b. Accordingly, the bandwidth of the bus 7 consumed by the processing of the I/O commands can be limited for each host sharing the SSD 3. For example, in a case where the host 2a issues I/O commands each having a larger amount of transfer data than that of I/O commands issued by the host 2b, it is possible to control such that the bandwidth of the bus 7 consumed by the processing of the I/O commands issued by the host 2a is limited, and the bandwidth of the bus 7 consumed by the processing of the I/O commands issued by the host 2b is not limited. Therefore, it is possible to adjust and control the quality of service regarding the I/O access performance for each of the hosts sharing the SSD 3.

In addition, the controller 4 may control the quality of service regarding the I/O access performance for each of the read operation and the write operation.

In this case, the I/O command count calculation unit 123 individually calculates the number of I/O commands processed per unit time for each of the read operation and the write operation.

The number of I/O commands processed per unit time related to the read operation indicates the number of read commands processed per unit time, that is, IOPS of the read operation. The number of I/O commands processed per unit time related to the write operation indicates the number of write commands processed per unit time, that is, IOPS of the write operation. The I/O command count calculation unit 123 calculates the number of read commands processed per unit time and the number of write commands processed per unit time using the values of two types of counters including (i) a counter that counts the number of read commands processed per unit time and (ii) a counter that counts the number of write commands processed per unit time. Each of these two types of counters is incremented and decremented in the same manner as the second counter value is incremented and decremented.

Similarly to the I/O command count calculation unit 123, the transfer data amount calculation unit 124 individually calculates the amount of transfer data per unit time for each of the read operation and the write operation.

The amount of transfer data per unit time related to the read operation indicates the amount of data transferred between the host 2 and the controller 4 according to the read commands processed per unit time, that is, the bandwidth of the read operation. The amount of transfer data per unit time related to the write operation indicates the amount of data transferred between the host 2 and the controller 4 according to the write commands processed per unit time, that is, the bandwidth of the write operation. The transfer data amount calculation unit 124 calculates the amount of transfer data per unit time related to the read operation and the amount of transfer data per unit time related to the write operation using the values of two types of counters including (i) a counter that counts the amount of transfer data per unit time related to the read operation and (ii) a counter that counts the amount of transfer data per unit time related to the write operation. Each of these two types of counters is incremented and decremented in the same manner as the first counter value is incremented and decremented.

The command processing unit 122 manages four types of thresholds respectively corresponding to the values of four types of counters. The four types of thresholds include a threshold indicating an upper limit value of IOPS related to a read operation that can be provided to the host 2, a threshold indicating an upper limit value of IOPS related to a write operation that can be provided to the host 2, a threshold indicating an upper limit value of a bandwidth related to a read operation that can be provided to the host 2, and a threshold indicating an upper limit value of a bandwidth related to a write operation that can be provided to the host 2.

When processing of a certain I/O command is completed, the command processing unit 122 determines whether the type of the completed command is a read command or a write command.

In a case where the type of the completed command is a read command, the command processing unit 122 determines whether or not a condition that the calculated number of read commands processed per unit time exceeds a threshold indicating an upper limit value of IOPS related to the read operation, or the calculated amount of transfer data per unit time related to the read operation exceeds a threshold indicating an upper limit value of a bandwidth related to the read operation is satisfied. While this condition is satisfied, the command processing unit 122 does not transmit, to the host 2, a completion response indicating completion of the read command.

In a case where the type of the completed command is a write command, the command processing unit 122 determines whether or not a condition that the calculated number of write commands processed per unit time exceeds a threshold indicating an upper limit value of IOPS related to the write operation, or the calculated amount of transfer data per unit time related to the write operation exceeds a threshold indicating an upper limit value of a bandwidth related to the write operation is satisfied. While this condition is satisfied, the command processing unit 122 does not transmit, to the host 2, a completion response indicating completion of this write command.

Incidentally, similarly to the completion response delay operation, the interrupt delay operation can also be executed using four types of counters and four types of thresholds.

Furthermore, in this embodiment, the command processing unit 122 can also execute a command fetch pause operation in addition to the completion response delay operation and the interrupt delay operation. The command fetch pause operation is an operation of delaying the timing of fetching a new I/O command from the host 2. Also by executing the command fetch pause operation, the command processing unit 122 can extend the time from when the new I/O command is issued by the host 2 to when the completion response or the interrupt is transmitted to the host 2. Therefore, the command fetch pause operation also enables adjustment and control of the quality of service regarding the I/O access performance that can be provided to the host 2. Details of the command fetch pause operation will be described with reference to FIG. 4 and subsequent drawings.

Next, configuration examples of the host 2a and the host 2b will be described. FIG. 2 is a block diagram illustrating an example of a configuration of a plurality of hosts sharing the SSD 3 according to the embodiment.

In FIG. 2, the host 2a and the host 2b are realized by using a virtualization system. A computing device 20 is a physical host. The computing device 20 is connected to the SSD 3 via the bus 7. In the computing device 20, a plurality of virtual machines (VMs) are executed. In each virtual machine (VM), an operating system (referred to as a guest operating system) and an application program are executed. The host 2a is realized by one virtual machine among the plurality of virtual machines (VMs). The host 2b is realized by another virtual machine among the plurality of virtual machines (VMs). The host 2a and the host 2b function as logical hosts. The host 2a and the host 2b, which are logical hosts, share the SSD 3 connected to the computing device 20. In addition, each of the host 2a and the host 2b creates its own SQ/CQ pair by executing a command for creating a submission queue and a completion queue. Then, each of the host 2a and the host 2b communicates with the SSD 3 through the created own SQ/CQ pair.

As a mechanism for sharing the SSD 3 between the host 2a and the host 2b, single root I/O virtualization (SR-IOV) defined by the PCIe standard can be used. The virtualization system using SR-IOV enables each of the host 2a and the host 2b to directly access the SSD 3.

Next, details of a process of controlling the quality of service regarding the I/O access performance for each of hosts, which is executed in the SSD 3 according to this embodiment, will be described. Each host may be a physical host or a logical host (i.e., virtual machine). Prior to description of processing according to this embodiment, first, processing executed in a memory system according to a comparative example will be described. FIG. 3 is a diagram illustrating an arbitration operation executed in the memory system according to the comparative example.

In the NVMe standard, an arbitration operation for fetching commands from a plurality of hosts is not defined. Here, an arbitration operation that can be considered for fairly fetching the I/O command from the host 2a and the host 2b will be described as the arbitration operation executed in the memory system according to the comparative example.

The SQ/CQ pair 21a of the host 2a includes four submission queues SQ 10 to SQ 13. Similarly to the host 2a, the SQ/CQ pair 21b of the host 2b also includes four submission queues SQ 20 to SQ 23. The memory system according to the comparative example executes processing of selecting one submission queue SQ from the submission queues SQ 10 to SQ 13 by round robin arbitration. In addition, the memory system according to the comparative example also executes processing of selecting one submission queue SQ from the submission queues SQ 20 to SQ 23 by round robin arbitration. Furthermore, the memory system according to the comparative example executes processing of selecting a fetch target submission queue SQ from the submission queue SQ selected from the submission queues SQ 10 to SQ 13 and the submission queue SQ selected from the submission queues SQ 20 to SQ 23, by round robin arbitration. The fetch target submission queue SQ is a submission queue from which N I/O commands are to be fetched.

As a result, in the round robin arbitration operation (RR arbitration) executed in the memory system according to the comparative example, the fetch target submission queue SQ is selected in the order of the submission queue SQ 10 of the host 2a, the submission queue SQ 20 of the host 2b, the submission queue SQ 11 of the host 2a, the submission queues SQ 21 of the host 2b, and so on. N I/O commands are fetched from each of the selected submission queues SQ.

The round robin arbitration operation (RR arbitration) executed in the memory system according to the comparative example enables fair command processing between the host 2a and the host 2b with respect to the number of I/O commands to be processed. However, in the following Case 1, unfairness occurs between the host 2a and the host 2b.

Case 1: The host 2a mainly issues 4MiB read commands. Each 4MiB read command is a read command that designates 4MiB as the data size of the read target data. The host 2b mainly issues 4KiB read commands. Each 4KiB read command is a read command that designates 4KiB as the data size of the read target data.

In this case, the host 2a consumes a bandwidth 1000 times larger than that of the host 2b.

This embodiment enables fair command processing between the host 2a and the host 2b for both the number of I/O commands and the bandwidth. Note that the ratio of the I/O access performance provided to the host 2a and the host 2b is not necessarily 50% to 50%, and the I/O access performance may be provided to the host 2a and the host 2b at a some weighted ratio such as 75% to 25%, for example.

Figure 4:
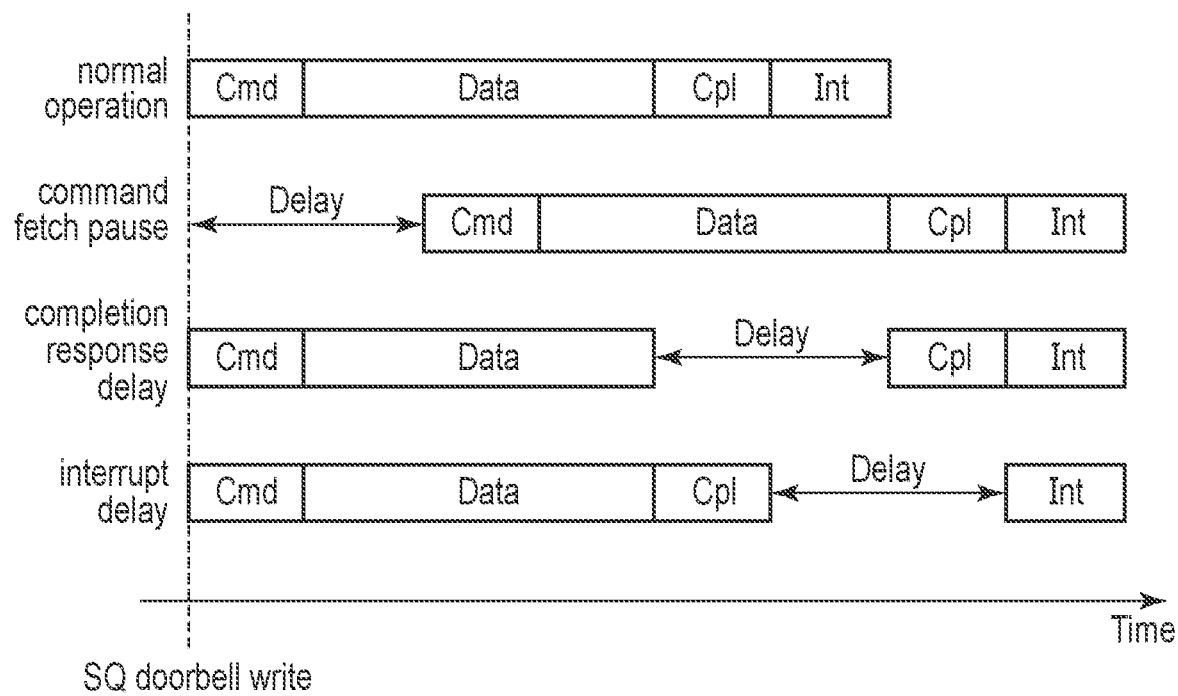
FIG. 4 is a diagram illustrating a normal operation, a command fetch pause operation, a completion response delay operation, and an interrupt delay operation, which are executed in the memory system according to the embodiment.

Hereinafter, details of the process of controlling the quality of service regarding the I/O access performance for each host, which is executed in the SSD 3 according to this embodiment, will be described. FIG. 4 is a diagram illustrating each of a normal operation, a command fetch pause operation, a completion response delay operation, and an interrupt delay operation, which are executed in the SSD 3 according to the embodiment. When that a new I/O command is stored in the submission queue (SQ) is notified from the host 2 by a SQ doorbell write, the controller 4 of the SSD 3 executes a processing sequence including command reception, data transfer, completion response transmission, and interrupt transmission. Here, the SQ doorbell write is an operation in which the host 2 preforms a write accesses to an SQ tail doorbell register included in the controller 4 to update an SQ tail pointer.

First, a processing sequence of the normal operation will be described.

In the normal operation, when the host 2 notifies that a new I/O command is stored in the submission queue (SQ) (SQ doorbell write in FIG. 4), the controller 4 executes command reception (Cmd in FIG. 4). The command reception is an operation of receiving an I/O command from the host 2 via the bus 7. Specifically, the controller 4 fetches the I/O command from the submission queue (SQ) of the host 2.

After receiving the I/O command from the host 2, the controller 4 executes data transfer according to the received I/O command (Data in FIG. 4). The data transfer is an operation of transferring data between the host 2 and the controller 4 via the bus 7. When the I/O command received from the host 2 is a read command, the controller 4 starts processing of the read command and reads data specified by the read command from the NAND flash memory 5. Then, the controller 4 transmits the read data to the host 2 via the bus 7. When the I/O command received from the host 2 is a write command, the controller 4 starts processing of the write command and receives write data associated with the write command from the host 2 via the bus 7. Then, the controller 4 writes the write data to the NAND flash memory 5.

When the processing of the received I/O command is completed, the controller 4 executes completion response transmission (Cpl in FIG. 4). The completion response transmission is an operation of transmitting a completion response indicating completion of the processing of the I/O command to the host 2 via the bus 7. Specifically, the controller 4 stores the completion response in a completion queue (CQ) of the host 2.

After executing the completion response transmission, the controller 4 executes interrupt transmission (Int in FIG. 4). The interrupt transmission is an operation of transmitting, to the host 2 via the bus 7, an interrupt for notifying the host 2 that the completion response has been transmitted. The interrupt is also referred to as an interrupt message.

Next, a processing sequence of the command fetch pause operation will be described. In the command fetch pause operation, the controller 4 delays the execution of the command reception. Specifically, when fetching a new command from the host 2, the controller 4 determines whether or not a fetch pause condition is satisfied. Details of the fetch pause condition will be described later with reference to FIG. 13. While the fetch pause condition is satisfied, the controller 4 does not execute the command reception (Delay in FIG. 4). That is, the controller 4 does not fetch the new I/O command. Then, when the fetch pause condition is no longer satisfied, the controller 4 executes the command reception.

After the command reception is executed, the controller 4 executes the data transfer, the completion response transmission, and the interrupt transmission. Since the data transfer, the completion response transmission, and the interrupt transmission are the same as the data transfer, the completion response transmission, and the interrupt transmission that are executed in the normal operation, detailed description is omitted herein.

By executing the command fetch pause operation, the controller 4 can extend the time from when the host 2 issues the I/O command to when the interrupt is transmitted to the host 2.

Next, a processing sequence of the completion response delay operation will be described. In the completion response delay operation, the controller 4 first executes the command reception and the data transfer. The command reception and the data transfer are the same as the command reception and the data transfer that are executed in the normal operation. When the processing of the received I/O command is completed, the controller 4 calculates the number of I/O commands processed per unit time and the amount of transfer data per unit time. Then, the controller 4 determines whether or not either the calculated number of I/O commands processed per unit time or the calculated amount of transfer data per unit time exceeds the corresponding threshold.

While either the calculated number of I/O commands processed per unit time or the calculated amount of transfer data per unit time exceeds the corresponding threshold, the controller 4 does not transmit a completion response corresponding to the completed I/O command to the host 2 (Delay in FIG. 4).

When each of the calculated number of I/O commands processed per unit time and the calculated amount of transfer data per unit time is equal to or less than the corresponding threshold, the controller 4 executes the completion response transmission and the interrupt transmission.

By executing the completion response delay operation, the controller 4 can extend the time from when the host 2 issues the I/O command to when the interrupt is transmitted to the host 2.

While the transmission timing of the completion response for the completed I/O command is delayed, processing of an I/O command subsequent to the completed I/O command may be completed. When the processing of the subsequent I/O command is completed, the controller 4 calculates again the number of I/O commands processed per unit time and the amount of transfer data per unit time. Then, the controller 4 determines whether or not either the calculated number of I/O commands processed per unit time or the calculated amount of transfer data per unit time exceeds the corresponding threshold.

When each of the calculated number of I/O commands processed per unit time and the calculated amount of transfer data per unit time is equal to or less than the corresponding threshold, the controller 4 executes the completion response transmission and the interrupt transmission. Accordingly, a completion response overtaking operation in which a completion response for the subsequent I/O command is transmitted to the host 2 before a completion response for the preceding I/O command is transmitted to the host 2 is executed.

For example, in a case where the size of the read/write data specified by the subsequent I/O command is smaller than the size of the read/write data specified by the preceding I/O command, such overtaking may occur.

Next, a processing sequence of the interrupt delay operation will be described. In the interrupt delay operation, the controller 4 first executes the command reception, the data transfer, and the completion response transmission. The command reception, the data transfer, and the completion response transmission are the same as the command reception, the data transfer, and the completion response transmission that are executed in the normal operation.

When the completion response transmission is executed, the controller 4 calculates the number of I/O commands processed per unit time and the amount of transfer data per unit time. Then, the controller 4 determines whether or not either the calculated number of I/O commands processed per unit time or the calculated amount of transfer data per unit time exceeds the corresponding threshold.

While either the calculated number of I/O commands processed per unit time or the calculated amount of transfer data per unit time exceeds the corresponding threshold, the controller 4 does not transmit an interrupt to the host 2 (Delay in FIG. 4).

When each of the calculated number of I/O commands processed per unit time and the calculated amount of transfer data per unit time is equal to or less than the corresponding threshold, the controller 4 executes interrupt transmission.

By executing the interrupt delay operation, the controller 4 can extend the time from when the host 2 issues the I/O command to when the interrupt is transmitted to the host 2.

Figure 5:
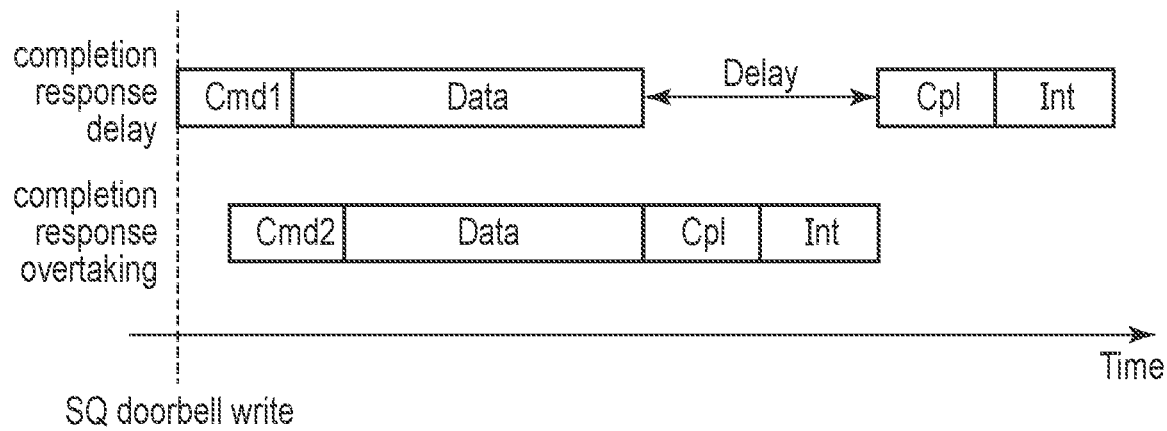
FIG. 5 is a diagram illustrating the completion response delay operation and a completion response overtaking operation, which are executed in the memory system according to the embodiment.

Next, details of the completion response overtaking operation will be described. FIG. 5 is a diagram illustrating a completion response delay operation process and a completion response overtaking operation process, which are executed in the SSD 3 according to the embodiment.

It is assumed that the controller 4 receives, as a new I/O command from the host 2, an I/O command Cmd1 and an I/O command Cmd2 that requests transfer of data smaller in size than the I/O command Cmd1. After receiving the I/O command Cmd1, the controller 4 receives the I/O command Cmd2.

First, the controller 4 receives the first I/O command Cmd1. Specifically, the controller 4 fetches the I/O command Cmd1 from the submission queue (SQ) of the host 2. Thereafter, the controller 4 receives the second I/O command Cmd2. Specifically, the controller 4 fetches the I/O command Cmd2 from the submission queue (SQ) of the host 2.

After receiving the I/O command Cmd1 from the host 2, the controller 4 executes data transfer according to the received I/O command Cmd1. When the I/O command Cmd1 received from the host 2 is a read command, the controller 4 starts processing of the read command and reads data specified by the read command from the NAND flash memory 5. Then, the controller 4 transmits the read data to the host 2 via the bus 7. When the I/O command Cmd1 received from the host 2 is a write command, the controller 4 starts processing of the write command and receives write data associated with the write command from the host 2 via the bus 7. Then, the controller 4 writes the write data to the NAND flash memory 5.

When the process of the received I/O command Cmd1 is completed, the controller 4 calculates the number of I/O commands processed per unit time and the amount of transfer data per unit time. Then, the controller 4 determines whether or not either the calculated number of I/O commands processed per unit time or the calculated amount of transfer data per unit time exceeds the corresponding threshold.

While either the calculated number of I/O commands processed per unit time or the calculated amount of transfer data per unit time exceeds the corresponding threshold, the controller 4 does not transmit a completion response corresponding to the completed I/O command Cmd1 to the host 2.

Then, similarly to the I/O command Cmd1, the controller 4 executes data transfer according to the received I/O command Cmd2. The size of the data transferred by the data transfer based on the I/O command Cmd2 is smaller than the size of the data transferred by the data transfer based on the I/O command Cmd1.

Then, when the processing of the I/O command Cmd2 is completed, the controller 4 may determine whether or not the completion response of the I/O command Cmd2 can be transmitted while the transmission of the completion response of the I/O command Cmd1 is delayed. The determination procedure is similar to that in the case of the I/O command Cmd1. When each of the calculated number of I/O commands processed per unit time and the calculated amount of transfer data per unit time is equal to or less than the corresponding threshold, the controller 4 executes the completion response transmission of the I/O command Cmd2 and the interrupt transmission of the I/O command Cmd2.

Accordingly, for the host 2, it seems that the time required for the processing of the I/O command Cmd1 becomes long. Further, the host 2 processes the completion response of the I/O command Cmd2 before the completion response of the I/O command Cmd1 issued before the I/O command Cmd2. As a result, the host 2 determines that the I/O access cannot be executed according to the assumed schedule. Therefore, issuance of a new I/O command by the host 2 is suppressed.

Next, a command process including the completion response delay operation will be described. FIG. 6 is a diagram illustrating a procedure of the command process including the completion response delay operation, which is executed in the SSD 3 according to the embodiment. FIG. 6 illustrates a procedure from when an I/O command is issued by the host 2 to when a completion response corresponding to the I/O command is processed by the host 2.

Step 1: First, the host 2 stores one or more new I/O commands to be transmitted to the SSD 3 in a submission queue (SQ). These one or more new I/O commands are stored in one or more free SQ slots starting from the slot indicated by the current value of a submission queue tail pointer (SQTP). The free SQ slot is a slot of the submission queue (SQ) that can be used to store a new I/O command. The new I/O command stored in the submission queue (SQ) may be a write command or a read command. In FIG. 6, each I/O command stored in the submission queue (SQ) is denoted as "CMD".

Step 2: In order to notify the controller 4 of the SSD 3 that the one or more new I/O commands are stored in the submission queue (SQ), the host 2 performs a write accesses to the submission queue tail doorbell register of the controller 4 corresponding to the submission queue (SQ), and updates the value of the submission queue tail pointer (SQTP) corresponding to the submission queue (SQ). The value of the submission queue tail pointer (SQTP) is incremented by the number of new I/O commands stored in the submission queue (SQ). Such updating of the submission queue tail pointer (SQTP) serves as a trigger for causing the controller 4 to start processing of each of the I/O commands stored in the submission queue (SQ).

Step 3: The controller 4 can recognize the number of new I/O commands stored in the submission queue (SQ) from a difference between a new value of the submission queue tail pointer (SQTP) and a previous value of the submission queue head pointer (SQHP). The controller 4 fetches one or more any number of I/O commands from the submission queue (SQ). Each fetched I/O command is temporarily stored in the internal buffer 161 of the controller 4.

Step 4: The controller 4 updates the value of the submission queue head pointer (SQHP) corresponding to the submission queue (SQ) such that the value of the submission queue head pointer (SQHP) corresponding to the submission queue (SQ) increases by the number of I/O commands fetched in step 3.

Step 5: The controller 4 executes each fetched I/O command. The order in which these I/O commands are executed is not limited, and these I/O commands may be executed in an order different from the order in which these commands are fetched. In the process of executing each I/O command, the controller 4 transfers data from the memory of the host 2 to the internal buffer 161 of the controller 4 or transfers data from the internal buffer 161 to the memory of the host 2 as necessary.

Step 6: When execution of a certain command is completed, the controller 4 first updates a completion queue tail pointer (CQTP) corresponding to a completion queue (CQ) associated with the submission queue (SQ) from which the completed I/O command is fetched, and increases a value of the completion queue tail pointer (CQTP) by one. The completion queue tail pointer (CQTP) indicates a slot of a completion queue (CQ) in which a next completion response is to be stored.

Step 7-1: The controller 4 calculates the number of I/O commands processed per unit time and the amount of transfer data per unit time in consideration of the completed I/O command.

Step 7-2: Based on the number of I/O commands processed per unit time calculated in step 7-1 and the amount of transfer data per unit time calculated in step 7-1, the controller 4 performs either a process of transmitting a new completion response corresponding to the completed I/O command to the host 2, or a process of delaying the transmission of the completion response. When both the number of I/O commands processed per unit time calculated in step 7-1 and the amount of transfer data per unit time calculated in step 7-1 do not exceed the corresponding thresholds, the controller 4 transmits the completion response to the host 2. In this case, the controller 4 stores the completion response in the completion queue (CQ). In FIG. 6, each of the completion responses stored in the completion queue (CQ) is indicated as "CPL". On the other hand, when either the number of I/O commands processed per unit time calculated in step 7-1 or the amount of transfer data per unit time calculated in step 7-1 exceeds the corresponding threshold, the controller 4 delays the transmission of the completion response. Thereafter, when each of the calculated number of I/O commands processed per unit time and the calculated amount of transfer data per unit time is equal to or less than the corresponding threshold, the controller 4 stores the completion response in the completion queue (CQ).

Step 8: The controller 4 transmits an interrupt to the host 2 to notify the host 2 that the new completion response is stored in the completion queue (CQ).

Step 9: The host 2 obtains the completion response from the slot of the completion queue (CQ) indicated by the current value of a completion queue head pointer (CQHP), and processes the obtained completion response.

Step 10: The host 2 performs a write access to the completion queue head doorbell register of the controller 4 corresponding to the completion queue (CQ), and updates the value of the completion queue head pointer (CQHP). The value of the completion queue head pointer (CQHP) is incremented by the number of completion responses processed in step 9.

In the completion response delay operation, the controller 4 delays the transmission of the completion response in a case where either the number of I/O commands calculated in step 7-1 or the amount of transfer data exceeds the corresponding threshold. Therefore, for the host 2, it seems that the time required for processing the I/O command becomes long. Accordingly, the host 2 determines that the I/O access cannot be executed with the assumed schedule, and thus it is possible to suppress issuance of new I/O commands by the host 2.

As described above, every time the processing of an I/O command is completed, the controller 4 calculates the number of I/O commands processed per unit time and the amount of transfer data per unit time. Then, based on the calculated number of I/O commands processed per unit time and the calculated amount of transfer data per unit time, the controller 4 determines, for each I/O command, whether to transmit the completion response to the host 2 or to delay the timing of transmitting the completion response to the host 2.

In this case, while the calculated number of I/O commands processed per unit time or the calculated amount of transfer data per unit time exceeds the corresponding threshold, the completion response is not transmitted to the host 2. Therefore, based on the condition of the I/O access performed by the host 2, the time that can be seen from host 2 to be required for processing the I/O command can be controlled for each I/O command. As a result, it is possible to control the quality of service regarding the I/O access performance that can be provided to the host 2.

In addition, the controller 4 may manage the value of the counter for each type of I/O command. For example, the controller 4 manages a value of a counter C0 that counts the amount of transfer data per unit time related to the read operation, a value of a counter C1 that counts the amount of transfer data per unit time related to the write operation, a value of a counter C2 that counts the number of read commands processed per unit time, and a value of a counter C3 that counts the number of write commands processed per unit time. The controller 4 determines the value of the counter to be updated, based on the type of the I/O command received from the host 2.

When the received I/O command is a read command, the controller 4 executes the operation of step 7-1 by adding the size of the read data specified by the received read command to the current value of the counter C0 to calculate a new value of the counter C0, and incrementing the current value of the counter C2 by one to calculate a new value of the counter C2.

Then, the controller 4 executes the operation of step 7-2 by comparing the value of the counter C0 to which the size of the read data has been added with the threshold indicating the upper limit value of the bandwidth related to the read operation, and comparing the value of the counter C2 incremented by one with the threshold indicating the upper limit value of IOPS related to the read operation.

When the received I/O command is a write command, the controller 4 executes the operation of step S7-1 by adding the size of the write data associated with the received write command to the current value of the counter C1 to calculate a new value of the counter C1, and incrementing the value of the counter C3 by 1 to calculate a new value of the counter C3.

Then, the controller 4 executes the operation of step 7-2 by comparing the value of the counter C1 to which the size of the write data has been added with the threshold indicating the upper limit value of the bandwidth related to the write operation, and comparing the value of the counter C3 incremented by one with the threshold indicating the upper limit value of IOPS related to the write operation.

As described above, in this embodiment, the condition of the I/O access by the host 2 is determined separately for the read operation and the write operation. Therefore, for example, even in a case where the read access by the host 2 requests IOPS exceeding the threshold or consumes a bandwidth exceeding the threshold, when the processing of the write command is completed, a completion response indicating completion of the write command is transmitted to the host 2 without delay.

Therefore, in a case where both the IOPS and the bandwidth for the write operation are equal to or less than the thresholds, it is possible to suppress only the performance of the read access that requests the IOPS exceeding the threshold or consumes the bandwidth exceeding the threshold without deteriorating the write access performance that can be provided to the host 2.

Next, a process in which the completion response delay operation and the command fetch pause operation are combined will be described. FIG. 7 is a diagram illustrating a procedure of a command process including the completion response delay operation and the command fetch pause operation, which is executed in the SSD 3 according to the embodiment. It is assumed that the controller 4 manages the values of the counters C0 to C3 for each type of the I/O command described above.

First, the processing of steps 1 and 2 in FIG. 7 is executed by the host 2. The processing of steps 1 to 2 in FIG. 7 is the same as the processing of steps 1 to 2 described with reference to FIG. 6, and thus the description thereof is omitted here. Next, the processing of step 3-1 and step 3-2 in FIG. 7 is executed as follows.

Step 3-1: The controller 4 refers to the new values of the counters C0 to C3 calculated in step 7-1.

Step 3-2: The controller 4 determines whether to fetch a new I/O command from the submission queue (SQ) or pause command fetch, based on the new value of each of the counters C0 to C3 referred to in step 3-1 and the threshold corresponding to each counter. When none of the new values of the counters C0 to C3 referred to in step 3-1 exceeds the corresponding threshold, the controller 4 fetches a new I/O command from the submission queue (SQ). On the other hand, when any of the new values of the counters C1 and C3 related to the write operation exceeds the corresponding threshold and any of the new values of the counters C0 and C2 related to the read operation exceeds the corresponding threshold, the controller 4 pauses the command fetch. That is, while at least one of a first condition that the new value of the counter C0 related to the read operation exceeds the corresponding threshold or a second condition that the new value of the counter C2 related to the read operation exceeds the corresponding threshold is satisfied, and at least one of a third condition that the new value of the counter C1 related to the write operation exceeds the corresponding threshold or a fourth condition that the new value of the counter C3 related to the write operation exceeds the corresponding threshold is satisfied, the controller 4 does not fetch any I/O command from the submission queue (SQ). Thereafter, when none of the new values of the counter C1 and the counter C3 related to the write operation exceeds the corresponding threshold, or none of the new values of the counter C0 and the counter C2 related to the read operation exceeds the threshold, the controller 4 fetches a new I/O command from the submission queue (SQ).

Next, the controller 4 executes the processing of step 4 to step 10 in FIG. 7. The processing of steps 4 to 10 of FIG. 7 is the same as the processing of steps 4 to 10 of the command processing described with reference to FIG. 6, and thus the description thereof is omitted here.

Note that in step 7-2, in a case where at least one of the first condition that the value of the counter C0 related to the read operation exceeds the corresponding threshold or the second condition that the value of the counter C2 related to the read operation exceeds the corresponding threshold is satisfied, and at least one of the third condition that the value of the counter C1 related to the write operation exceeds the corresponding threshold or the fourth condition that the value of the counter C3 related to the write operation exceeds the corresponding threshold is satisfied, a completion response for a completed I/O command is not transmitted to the host 2 even in a case where the completed I/O command is either the read command or the write command. In such a case, if a new I/O command is fetched from the host 2 and processed, there is a possibility that many completion responses that cannot be transmitted to the host 2 are stayed in the controller 4. In this embodiment, a command fetch pause operation is executed, and thus it is possible to prevent memory resources in the controller 4 from being consumed by many completion responses that cannot be transmitted to the host 2.

Next, a command process including the interrupt delay operation will be described. FIG. 8 is a diagram illustrating a procedure of the command process including the interrupt delay operation, which is executed in the SSD 3 according to the embodiment. FIG. 8 illustrates a procedure from when an I/O command is issued by the host 2 to when a completion response corresponding to the I/O command is processed by the host 2. It is assumed that the controller 4 manages the values of the counters C0 to C3 for each type of the I/O command described above.

First, the processing of steps 1 to 6 in FIG. 8 is executed by the host 2. The processing of steps 1 to 6 of FIG. 8 is the same as the processing of steps 1 to 6 of the command processing described with reference to FIG. 6, and thus the description thereof is omitted here. Next, the processing of step 7, step 8-1, and step 8-2 in FIG. 8 is executed as follows.

Step 7: The controller 4 transmits the completion response of the I/O command executed in step 5 to the host 2. More specifically, the controller 4 stores the completion response in the completion queue (CQ) of the host 2.

Step 8-1: The controller 4 calculates the number of I/O commands processed per unit time and the amount of transfer data per unit time in consideration of the completed I/O command. In this case, the controller 4 updates the value of the counter C0 or the value of the counter C1 such that the value of the counter C0 or the value of the counter C1 is incremented by the size of the transferred data. Further, the controller 4 updates the value of the counter C2 or the value of the counter C3 such that the value of the counter C2 or the value of the counter C3 is incremented by one.

Step 8-2: The controller 4 determines whether to transmit, to the host 2, an interrupt for notifying that a new completion response is transmitted or delay the transmission of the interrupt, based on the value of each counter updated in step 8-1 among the counters C0 to C3. When none of the values of the counters updated in step 8-1 exceeds the corresponding threshold, the controller 4 transmits an interrupt to the host 2. On the other hand, when any of the updated counter values exceeds the threshold, the controller 4 delays the transmission of the interrupt. Thereafter, the controller 4 waits until all the values of the counters updated in step 8-1 do not exceed the threshold as each counter value decreases due to elapse of time or the like. Until none of the values of the counters updated in step 8-1 exceeds the corresponding threshold, the controller 4 does not transmit any interrupt to the host 2. Then, when none of the values of the counters updated in step 8-1 exceeds the corresponding threshold, the controller 4 transmits an interrupt to the host 2.

Next, the host 2 executes the process of step 10 in FIG. 8. The processing of step 10 of FIG. 8 is the same as the processing of step 10 of the command processing described with reference to FIG. 6, and thus the description thereof is omitted here.

As described above, every time the processing of the I/O command is completed, the controller 4 transmits a completion response to the host 2, and then, calculates the number of I/O commands processed per unit time and the amount of transfer data per unit time. Next, based on the calculated number of I/O commands processed per unit time and the calculated amount of transfer data per unit time, the controller 4 determines whether to transmit the interrupt to the host 2 or to delay the timing of transmitting the interrupt to the host 2. In this case, while the calculated number of I/O commands processed per unit time or the calculated amount of transfer data per unit time exceeds the corresponding threshold, no interrupt is transmitted to the host 2. Therefore, based on the condition of the I/O access by the host 2, the time that can be seen from host 2 to be required for processing the I/O command can be controlled for each I/O command. As a result, it is possible to control the quality of service regarding the I/O access performance that can be provided to the host 2.

Next, a process in which the interrupt delay operation and the command fetch pause operation are combined will be described. FIG. 9 is a diagram illustrating a procedure of a command process including the interrupt delay operation and the command fetch pause operation, which is executed in the SSD 3 according to the embodiment. It is assumed that the controller 4 manages the values of the counters C0 to C3 for each type of the I/O command described above.

First, the processing of steps 1 and 2 in FIG. 9 is executed by the host 2. The processing of steps 1 and 2 of FIG. 9 is the same as the processing of steps 1 and 2 of the command processing described with reference to FIG. 6, and thus the description thereof is omitted here. Then, the processing of step 3-1 and step 3-2 in FIG. 9 is executed as follows.

Step 3-1: The controller 4 refers to the value of the counter C0, the value of the counter C1, the value of the counter C2, and the value of the counter C3.

Step 3-2: The controller 4 determines whether to fetch a new I/O command from the submission queue (SQ) or pause command fetch, based on the value of each of the counters C0 to C3 referred to in step 3-1 and the threshold corresponding to each counter. When none of the values of the counters C0 to C3 referred to in step 3-1 exceeds the corresponding threshold, the controller 4 fetches a new I/O command from the submission queue (SQ). On the other hand, when any of the values of the counters C1 and C3 related to the write operation exceeds the corresponding threshold and any of the values of the counters C0 and C2 related to the read operation exceeds the corresponding threshold, the controller 4 pauses the command fetch. That is, while at least one of the first condition that the value of the counter C0 related to the read operation exceeds the corresponding threshold or the second condition that the value of the counter C2 related to the read operation exceeds the corresponding threshold is satisfied, and at least one of the third condition that the value of the counter C1 related to the write operation exceeds the corresponding threshold or the fourth condition that the value of the counter C3 related to the write operation exceeds the corresponding threshold is satisfied, the controller 4 does not fetch any I/O command from the submission queue (SQ). Thereafter, when none of the values of the counter C1 and the counter C3 related to the write operation exceeds the corresponding thresholds, or none of the values of the counter C0 and the counter C2 related to the read operation exceeds the thresholds, the controller 4 fetches a new I/O command from the submission queue (SQ).

Next, the controller 4 executes the processing of step 4 to step 10 in FIG. 9. The processing of steps 4 to 10 in FIG. 9 is the same as the processing of steps 4 to 10 of the command processing described with reference to FIG. 8, and thus the description thereof is omitted here.

As described above, even in the SSD 3 in which not the completion response delay operation but the interrupt delay operation is implemented, it is possible to cause the controller 4 to implement the command fetch pause process.

Here, the thresholds used in the completion response delay operation, the interrupt delay operation, and the command fetch pause operation will be described.

Figure 10:
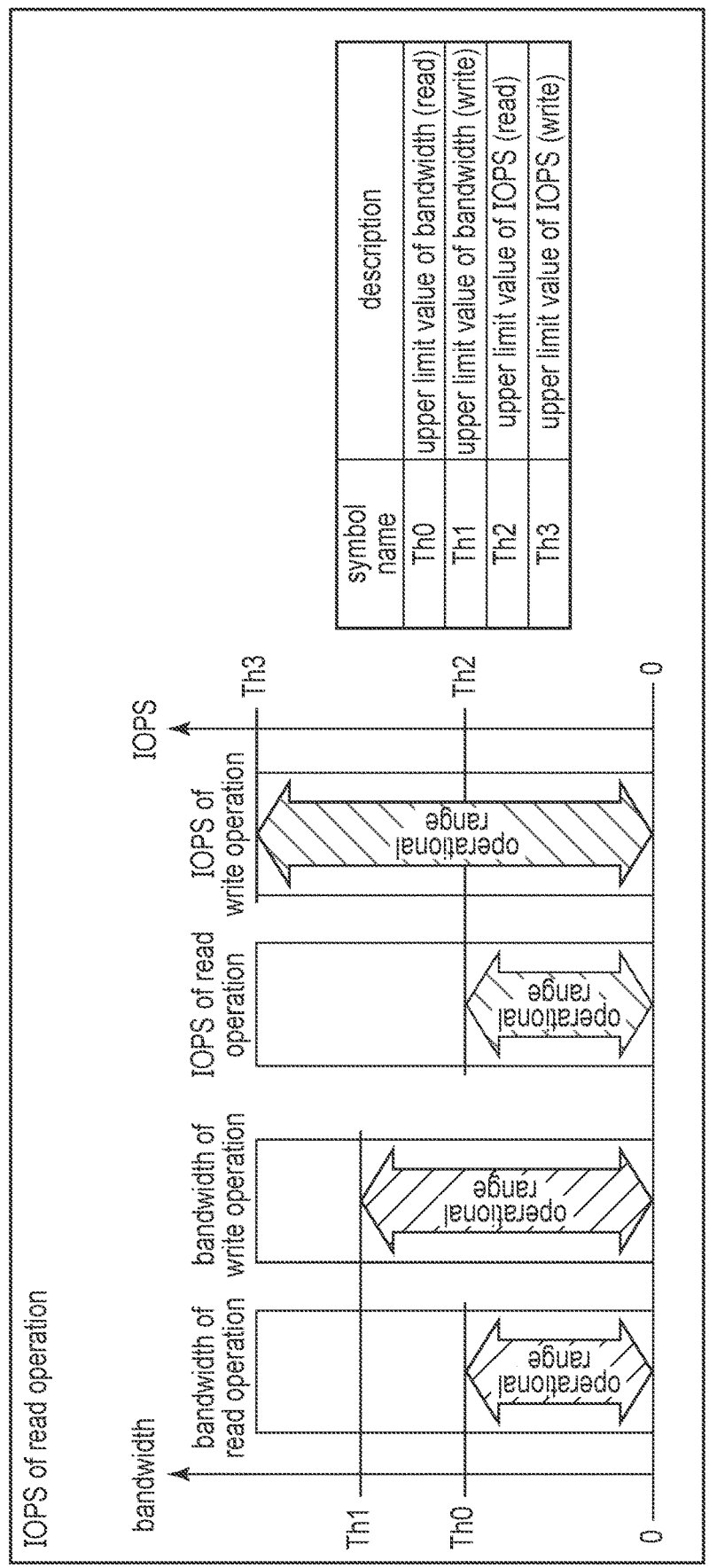
FIG. 10 is a diagram illustrating four types of thresholds used in the memory system according to the embodiment.

FIG. 10 is a diagram illustrating four types of thresholds used in the SSD 3 according to the embodiment.

The controller 4 manages two thresholds related to bandwidth that can be provided to the host 2 and two thresholds related to IOPS that can be provided to the host 2.

The controller 4 manages a threshold Th0 indicating an upper limit value of the bandwidth of the read operation and a threshold Th1 indicating an upper limit value of the bandwidth of the write operation. The controller 4 uses the threshold Th0 and the threshold Th1 as thresholds for limiting the total amount of data transferred between the host 2 and the SSD 3 per unit time. That is, the controller 4 uses the threshold Th0 to limit the total amount of data transferred with the read operation per unit time. In addition, the controller 4 uses the threshold Th1 to limit the total amount of data transferred with the write operation per unit time.

The controller 4 further manages a threshold Th2 indicating an upper limit value of IOPS of the read operation and a threshold Th3 indicating an upper limit value of IOPS of the write operation. The controller 4 uses the threshold Th2 and the threshold Th3 as thresholds for managing the number of I/O commands that can be processed per unit time. That is, the controller 4 uses the threshold Th2 to limit the number of read commands that can be processed per unit time. In addition, the controller 4 uses the threshold Th3 to limit the number of write commands that can be processed per unit time.

The thresholds Th0 to Th3 can be set for each host. For example, in a case where the SSD 3 is shared by the host 2a and the host 2b, the thresholds Th0 to Th3 corresponding to the host 2a are set, and the thresholds Th0 to Th3 corresponding to the host 2b are also set. The thresholds Th0 to Th3 corresponding to the host 2a and the thresholds Th0 to Th3 corresponding to the host 2b can be set to any values based on I/O access performance to be provided to each of the host 2a and the host 2b. However, any of the thresholds Th0 to Th3 is set so as not to exceed the upper limit of the capability of the SSD 3 with respect to the bandwidth and IOPS.

Figure 11:
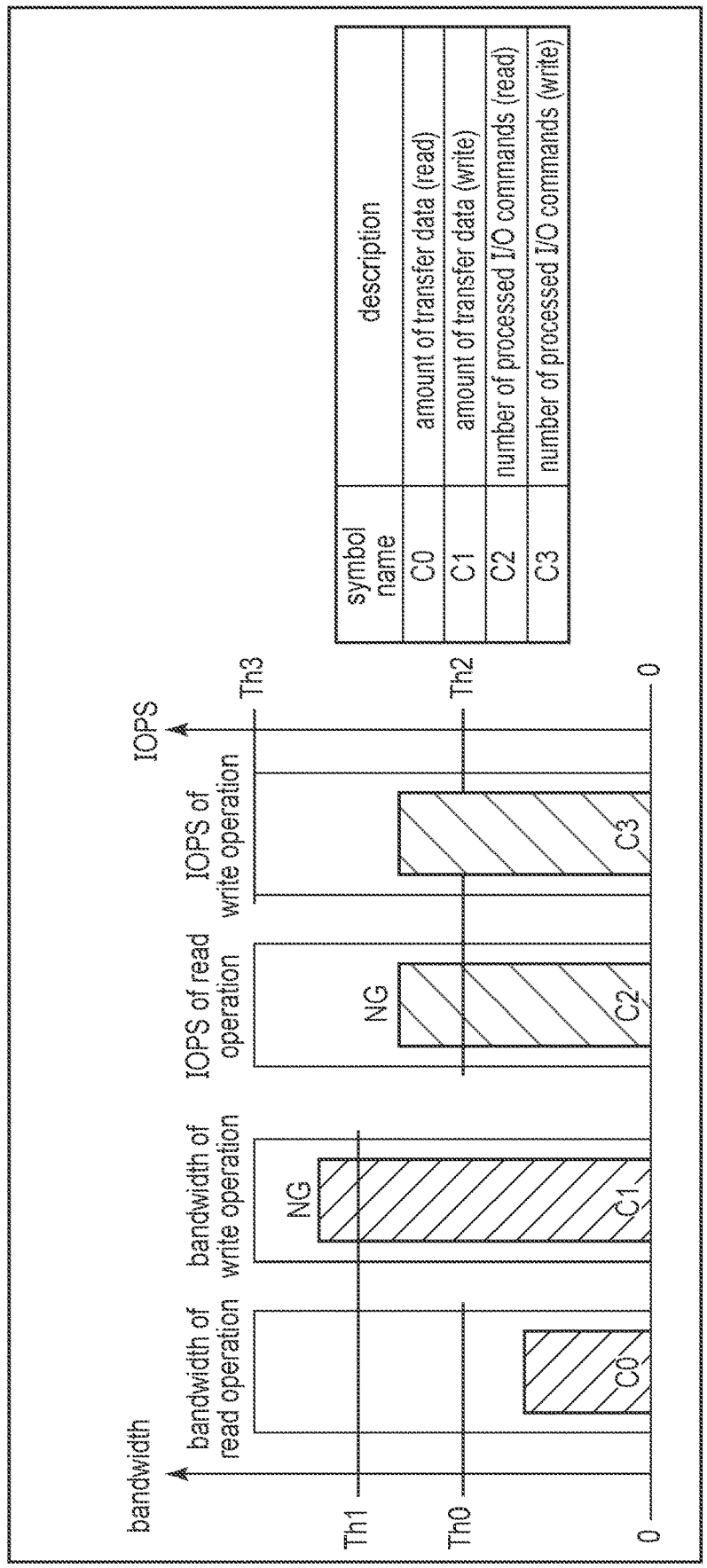
FIG. 11 is a diagram illustrating four types of counter values used in the memory system according to the embodiment.

FIG. 11 is a diagram illustrating four types of counter values used in the SSD 3 according to the embodiment.

The four types of counter values managed by the controller 4 include values of two counters C0 to C1 related to the amount of transfer data and values of two counters C2 to C3 related to the number of processed I/O commands.

The controller 4 uses the value of the counter C0 and the value of the counter C1 as counter values for managing the total amount of data transmitted and received between the host 2 and the SSD 3 per unit time. That is, after executing the processing related to the read operation, the controller 4 records the total amount of data transferred with the read operation per unit time by increasing the value of the counter C0 by the size of the read data. Further, after executing the processing related to the write operation, the controller 4 records the total amount of data transferred with the write operation per unit time by increasing the value of the counter C1 by the size of the write data.

Further, the controller 4 uses the value of the counter C2 and the value of the counter C3 as counter values for managing the number of I/O commands that can be processed per unit time. That is, after executing the processing related to the read operation, the controller 4 records the number of read commands processed per unit time by incrementing the value of the counter C2 by one. Further, after executing the processing related to the write operation, the controller 4 records the number of write commands processed per unit time by incrementing the value of the counter C3 by one.

The controller 4 compares the values of the counters C0 to C3 with the thresholds Th0 to Th3, respectively. For example, the controller 4 can control the value of each counter not to exceed the corresponding threshold. FIG. 11 illustrates a case where the value of the counter C1 and the value of the counter C2 exceed the threshold.

The four types of counters C0 to C3 can be prepared for each host. Then, for each host, the number of I/O commands processed per unit time and the amount of transfer data per unit time are calculated using the counters C0 to C3.

For example, when the processing of the I/O command received from the host 2a is completed, the controller 4 calculates the number of I/O commands from the host 2a processed per unit time and the amount of transfer data per unit time transferred between the host 2a and the controller 4 by using the four types of counters C0 to C3 corresponding to the host 2a.

When both the calculated number of I/O commands processed per unit time and the calculated amount of transfer data per unit time are equal to or less than the corresponding thresholds set for the host 2a, the controller 4 transmits a completion response indicating completion of the I/O command to the host 2a.

While either the calculated number of I/O commands processed per unit time or the calculated amount of transfer data per unit time exceeds the corresponding threshold set for the host 2a, the controller 4 does not transmit the completion response indicating the completion of this I/O command to the host 2a.

Also for the host 2b, processing similar to the processing for the host 2a is executed.

Next, a procedure of the completion response delay operation will be described. FIG. 12 is a flowchart illustrating a procedure of the completion response delay operation executed in the SSD 3 according to the embodiment.

When processing of a certain I/O command is completed or when there is a completion response delayed in transmission, the controller 4 starts a completion response delay operation (step S101). The controller 4 may start the completion response delay operation immediately after completing the processing of this I/O command, may start the completion response delay operation immediately after the transmission of the completion response for this I/O command is delayed, or may start the completion response delay operation after a certain period of time has elapsed since the transmission of the completion response for this I/O command was delayed.

The controller 4 determines the type of a processing target command (step S102). The processing target command is an I/O command for which processing is completed in step S101 or an I/O command corresponding to a completion response for which transmission is delayed in step S101. The controller 4 determines whether the processing target command is a read command or a write command.

When the processing target command is a read command (read command in step S102), the controller 4 calculates a new value (New C0) of the counter C0 related to the read operation and a new value (New C2) of the counter C2 related to the read operation (step S103). First, the controller 4 adds the size of the read data transmitted to the host 2 in the read operation based on the processing target command to the value of the counter C0 to calculate the New C0. Then, the controller 4 adds one to the value of the counter C2 to calculate the New C2. That is, the controller 4 calculates the amount of transfer data per unit time and the number of read commands processed per unit time in consideration of the processing target read command.

The controller 4 determines whether or not at least one of a condition that the New C0 calculated in step S103 exceeds the threshold Th0 or a condition that the New C2 exceeds the threshold Th2 is satisfied (step S104).

When neither the condition that the New C0 calculated in step S103 exceeds the threshold Th0 nor the condition that the New C2 calculated in step S103 exceeds the threshold Th2 is satisfied, that is, when the New C0 is equal to or less than the threshold Th0 and the New C2 is equal to or less than the threshold Th2 (No in step S104), the controller 4 transmits a completion response of the processing target command to the host 2 (step S105). In step S105, the controller 4 stores the completion response of the processing target command in the completion queue (CQ). Then, the controller 4 updates the counter C0 and the counter C2 (step S106). That is, the controller 4 updates the counter C0 using the New C0 calculated in step S103, and further updates the counter C2 using the New C2 calculated in step S103.

When the value of the New C0 exceeds the threshold Th0 or the value of the New C2 exceeds the threshold Th2 (Yes in step S104), the controller 4 delays transmission of the completion response of the processing target command (step S107). That is, the controller 4 does not transmit the completion response of the processing target command. Accordingly, the controller 4 suppresses issuance of a new I/O command by the host 2. Thereafter, the controller 4 may start the process of step S101 again or may start the process of step S101 after a certain period of time has elapsed.

On the other hand, when the processing target command is a write command (write command in step S102), the controller 4 calculates a new value (New C1) of the counter C1 related to the write operation and a new value (New C3) of the counter C3 related to the write operation (step S108). First, the controller 4 adds the size of the write data received from the host 2 in the write operation based on the processing target command to the value of the counter C1 to calculate the New C1. Then, the controller 4 adds one to the value of the counter C3 to calculate the New C3. That is, the controller 4 calculates each of the amount of transfer data per unit time and the number of write commands processed per unit time in consideration of the processing target write command.

The controller 4 determines whether or not at least one of a condition that the New C1 calculated in step S108 exceeds the threshold Th1 or a condition that the New C3 exceeds the threshold Th3 is satisfied (step S109).

When neither the condition that the New C1 calculated in step S108 exceeds the threshold Th1 nor the condition that the New C3 calculated in step S108 exceeds the threshold Th3 is satisfied, that is, when the New C1 is equal to or less than the threshold Th1 and the New C3 is equal to or less than the threshold Th3 (No in step S109), the controller 4 transmits a completion response of the processing target command to the host 2 (step S110). In step S110, the controller 4 stores the completion response of the processing target command in the completion queue (CQ). Then, the controller 4 updates the counter C1 and the counter C3 (step S111). That is, the controller 4 updates the counter C1 using the New C1 calculated in step S108, and further updates the counter C3 using the New C3 calculated in step S108.

When the New C1 exceeds the threshold Th1 or when the New C3 exceeds the threshold Th3 (Yes in step S109), the controller 4 delays transmission of the completion response of the processing target command (step S107). That is, the controller 4 does not transmit the completion response of the processing target command. Accordingly, the controller 4 suppresses issuance of a new I/O command by the host 2. Thereafter, the controller 4 may start the operation of step S101 again or may start the operation of step S101 after a certain period of time has elapsed.

As described above, the controller 4 determines whether to transmit or delay the completion response corresponding to the I/O command by using the size of the data transmitted and received in the processing of the I/O command. Therefore, a completion response corresponding to an I/O command on which the transfer of the large-sized data has been executed is more likely to be delayed than a completion response corresponding to an I/O command on which the transfer of the small-sized data has been executed.

For example, when the processing of the first write command is completed, the operation according to step S108 of FIG. 12 is executed, and the New C1 exceeds the threshold Th1, a completion response corresponding to the first write command is not transmitted, and the processing illustrated in FIG. 12 ends. Thereafter, in a case where processing of the second write command requiring transfer of data having a size smaller than that of the first write command is completed before the completion response corresponding to the first write command is transmitted, the controller 4 executes the processing illustrated in FIG. 12 in which the second write command is set as a processing target command. Then, when none of the New C1 and the New C3 calculated in step 108 exceeds the threshold, the controller 4 transmits a completion response corresponding to the second write command to the host 2 prior to the completion response corresponding to the first write command. Accordingly, the controller 4 can execute the completion response overtaking operation.

Figure 13:
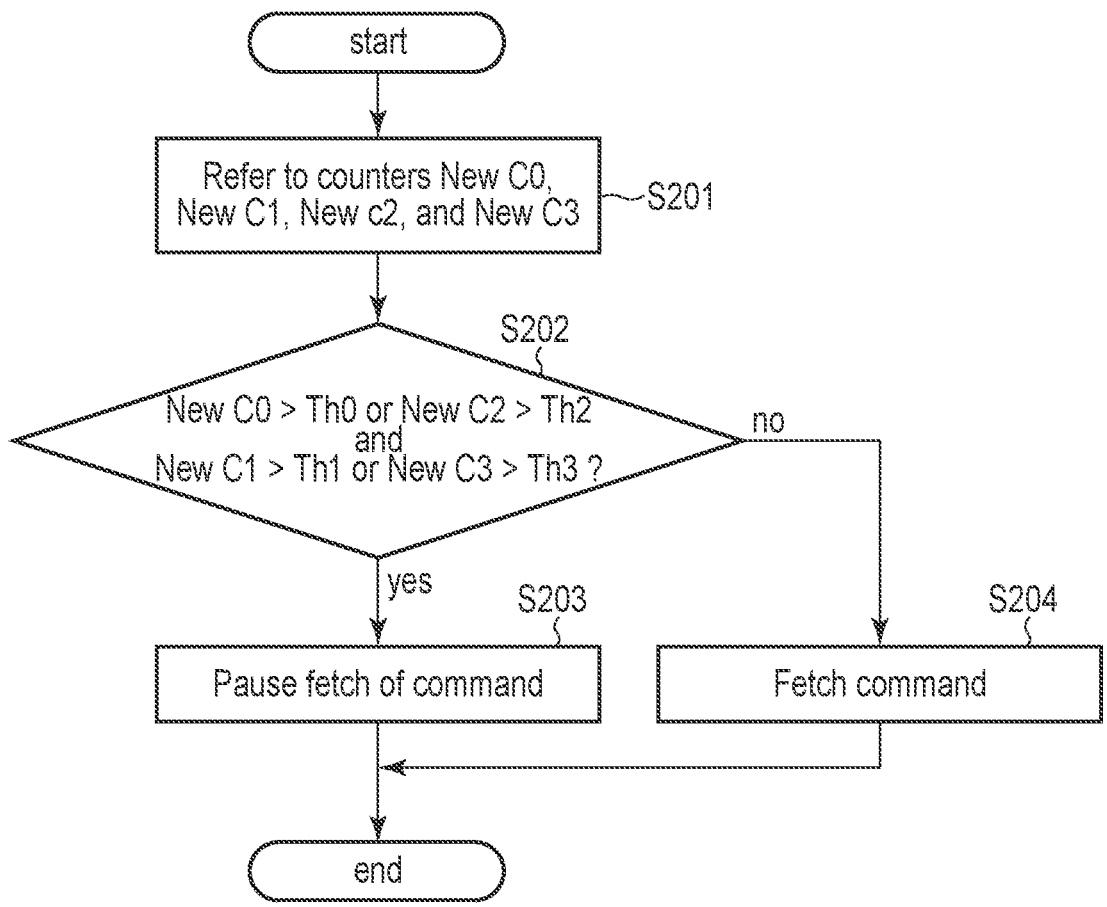
FIG. 13 is a flowchart illustrating a procedure of a first command fetch pause operation executed in the memory system according to the embodiment.

Next, the command fetch pause operation will be described. FIG. 13 is a flowchart illustrating a procedure of a first command fetch pause operation executed in the SSD 3 according to the embodiment.

For example, the controller 4 starts the command fetch pause operation in response to notification from the host 2 that a new I/O command has been stored in the submission queue (SQ).

First, the controller 4 refers to the New C0 to the New C3 calculated in step S103 and step S108 of FIG. 12 (step S201).

The controller 4 determines whether or not the following condition is satisfied (step S202).
((New C0>Th0) or (New C2>Th2)) and
((New C1>Th1) or (New C3>Th3))

When the condition in step S202 is satisfied (Yes in step S202), the controller 4 pauses the fetch of the I/O command (step S203). That is, the controller 4 executes the command fetch pause operation in step S203 when either the New C0 or the New C2 exceeds the corresponding threshold and either the New C1 or the New C3 exceeds the corresponding threshold. The controller 4 may execute the operation of step S201 again after a lapse of a certain period of time after pausing the command fetch, or may execute the operation of step S201 again in response to the new value of each counter being calculated again.

When the condition in step S202 is not satisfied (No in step S202), the controller 4 fetches the I/O command from the submission queue (SQ) (step S204). That is, the controller 4 executes the command fetch operation in step S204 in a case where none of the New C0 and the New C2 exceeds the corresponding threshold, or none of the New C1 and the New C3 exceeds the corresponding threshold.

FIG. 14 is a diagram illustrating a change in the counter value in the interrupt delay operation executed in the SSD 3 according to the embodiment.

When executing the interrupt delay operation, the controller 4 updates the value of each counter in consideration of the processing of the completed I/O command after completing the processing of the I/O command. Therefore, in the SSD 3 capable of executing the interrupt delay operation, the value of each counter may be a value exceeding the corresponding threshold.

The first bar graph from the left shows a state in which the value of a counter $C^*$ exceeds a threshold $Th^*$. Here, the counter $C^*$ represents any counter among the counters C0 to C3. The threshold $Th^*$ represents a threshold corresponding to the counter $C^*$ among Th0 to Th3. Since the value of the counter $C^*$ exceeds the threshold $Th^*$, the controller 4 delays the interrupt transmission.

Thereafter, the controller 4 decrements the value of the counter $C^*$ according to the lapse of time. The first bar graph from the right shows a state in which the value of the counter $C^*$ is below the threshold $Th^*$. Accordingly, the controller 4 determines that the interrupt transmission is possible, and transmits the delayed interrupt to the host 2. The host 2 that has received the interrupt processes the completion response stored in the completion queue (CQ) and recognizes that the issued command is completed.

Next, a procedure of the interrupt delay operation will be described. FIG. 15 is a flowchart illustrating a procedure of the interrupt delay operation executed in the SSD 3 according to the embodiment.

When processing of a certain I/O command is completed, the controller 4 transmits a completion response corresponding to this I/O command to the host 2 (step S301). In step S301, the controller 4 stores the completion response in the completion queue (CQ). After storing the completion response in the completion queue (CQ), the controller 4 executes the following interrupt delay operation.

First, the controller 4 determines the type of a processing target command (step S302). The processing target command is an I/O command in which the processing is completed in step S301 and the corresponding completion response is stored in the completion queue. The controller 4 determines whether the processing target command is a read command or a write command.

When the processing target command is a read command (read command in step S302), the controller 4 updates the values of the counter C0 related to the read operation and the counter C2 related to the read operation (step S303). First, the controller 4 adds the size of the read data transmitted to the host 2 in the read operation based on the processing target command to the original value of the counter C0 to calculate the value of the counter C0. The controller 4 adds one to the original value of the counter C2 to calculate the value of the counter C2. Then, the controller 4 updates the values of the counters C0 and C2 using these calculated values, respectively.

The controller 4 determines whether or not at least one of a condition that the value of the counter C0 updated in step S303 exceeds the threshold Th0 or a condition that the value of the counter C2 exceeds the threshold Th2 is satisfied (step S304).

When the value of the counter C0 exceeds the threshold Th0 or the value of the counter C2 exceeds the threshold Th2 (Yes in step S304), the controller 4 waits until the condition of step S304 is not satisfied without transmitting an interrupt (step S305). The controller 4 waits until the value of the counter C0 falls below the threshold Th0 and the value of the counter C2 falls below the threshold Th2 due to a decrement with the lapse of time. When the condition of step S304 is not satisfied, the controller 4 transmits an interrupt to the host 2 (step S306). When receiving the interrupt, the host 2 recognizes that the completion response is stored in the completion queue (CQ).

When the value of the counter C0 is equal to or less than the threshold Th0 and the value of the counter C2 is equal to or less than the threshold Th2 (No in step S304), the controller 4 transmits an interrupt to the host 2 (step S306).

On the other hand, when the processing target command is a write command (write command in step S302), the controller 4 updates the value of the counter C1 related to the write operation and the value of the counter C3 related to the write operation (step S307). First, the controller 4 adds the size of the write data received from the host 2 in the write operation based on the processing target command to the original value of the counter C1 to calculate the value of the counter C1. Then, the controller 4 adds one to the original value of the counter C3 to calculate the value of the counter C3. Then, the controller 4 updates the values of the counters C1 and C3 using these calculated values, respectively.

The controller 4 determines whether or not at least one of a condition that the value of the counter C1 updated in step S308 exceeds the threshold Th1 or a condition that the value of the counter C3 exceeds the threshold Th3 is satisfied (step S308).

When the value of the counter C1 exceeds the threshold Th1 or the value of the counter C3 exceeds the threshold Th3 (Yes in step S308), the controller 4 waits until the condition of step S308 is not satisfied without transmitting an interrupt (step S309). The controller 4 waits until the counter C1 falls below the threshold Th1 and the counter C3 falls below the threshold Th3 due to a decrement with the lapse of time. When the condition of step S308 is not satisfied, the controller 4 transmits an interrupt to the host 2 (step S306). When receiving the interrupt, the host 2 recognizes that the completion response is stored in the completion queue (CQ).

When the value of the counter C1 is equal to or less than the threshold Th1 and the value of the counter C3 is equal to or less than the threshold Th3 (No in step S308), the controller 4 transmits an interrupt to the host 2 (step S306).

As described above, the controller 4 determines whether or not to delay the transmission of the interrupt notifying that the completion response corresponding to the I/O command is transmitted, by using the size of the data transferred in the process based on the I/O command. While the interrupt transmission is delayed, even when processing of another I/O command is completed, the controller 4 cannot transmit the interrupt to the host 2 in response to the completion. This is because when the interrupt is transmitted to the host 2, the completion response corresponding to the processing target command is processed by the host 2. Therefore, while the interrupt transmission is delayed, the controller 4 also pauses the process of transmitting a completion response for the I/O command subsequent to the processing target command to the host 2.

In addition, for example, while the interrupt transmitted in response to the completion of the write command is delayed, even when the read command is completed, the controller 4 cannot transmit the interrupt to the host 2 in response to the completion. Therefore, while the interrupt transmission for the write command is delayed, the controller 4 also delays the interrupt transmission for the read command.

Next, a command fetch pause operation executed by the controller 4 when the SSD 3 can execute the interrupt delay operation will be described.

Figure 16:
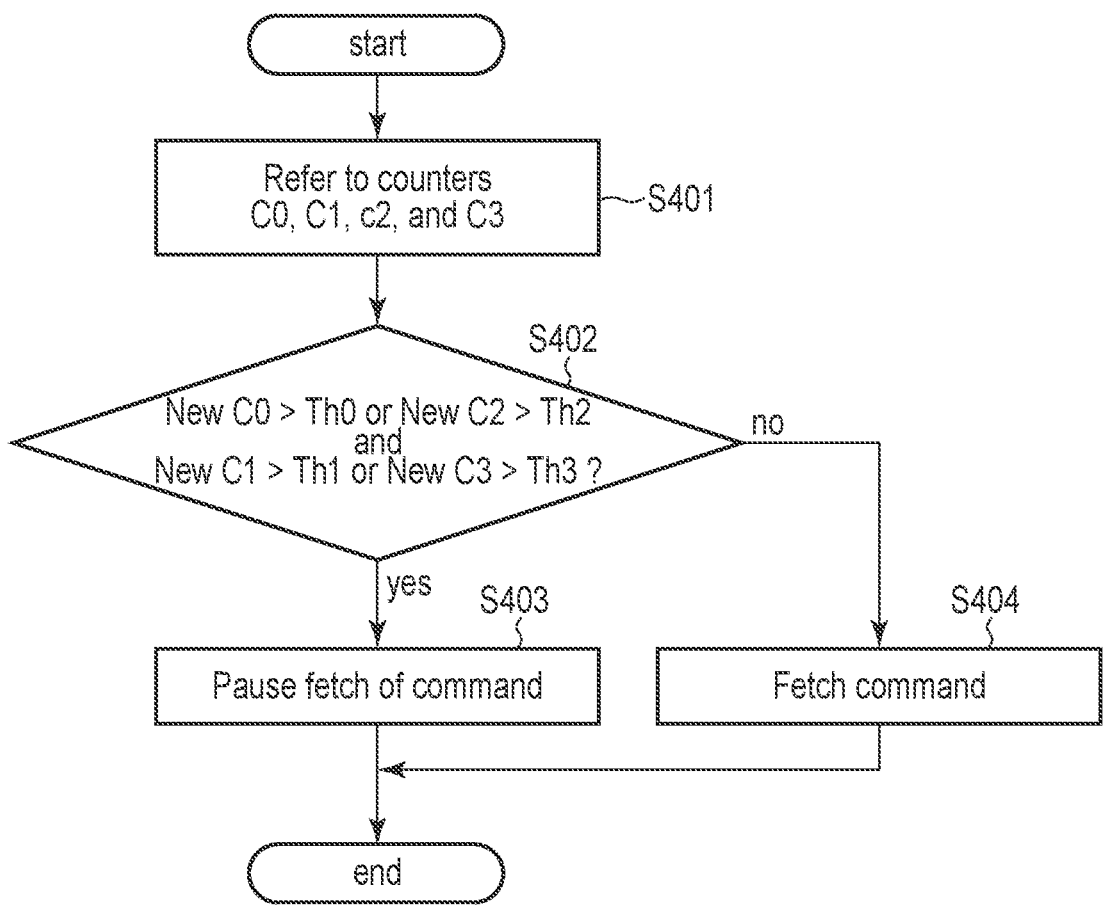
FIG. 16 is a flowchart illustrating a procedure of a second command fetch pause operation executed in the memory system according to the embodiment.

FIG. 16 is a flowchart illustrating a procedure of a second command fetch pause operation executed in the SSD 3 according to the embodiment.

For example, the controller 4 starts the command fetch pause operation in response to notification from the host 2 that a new I/O command has been stored in the submission queue (SQ).

First, the controller 4 refers to the values of the counters C0 to C3 updated in steps S303 and S307 of FIG. 15 (step S401). The controller 4 may start the operation of step S401 in response to a new command being stored in the submission queue (SQ).

The controller 4 determines whether or not the following condition is satisfied (step S402).

((C0>Th0) or (C2>Th2)) and
((C1>Th1) or (C3>Th3))

When the condition in step S402 is satisfied (Yes in step S402), the controller 4 pauses the fetch of the command (step S403). That is, in a case where either the value of the counter C0 related to the read operation or the value of the counter C2 related to the read operation exceeds the corresponding threshold, and either the value of the counter C1 related to the write operation or the value of the counter C3 related to the write operation exceeds the corresponding threshold, the controller 4 executes the command fetch pause operation of step S403. The controller 4 may execute the operation of step S401 again after a lapse of a certain period of time after pausing the command fetch, or may execute the operation of step S401 again in response to the value of each counter being calculated again.

When the condition in step S402 is not satisfied (No in step S402), the controller 4 fetches a new I/O command from the submission queue (SQ) (step S404). That is, the controller 4 executes the command fetch operation in step S404 in a case where none of the value of the counter C0 related to the read operation and the value of the counter C2 related to the read operation exceeds the corresponding threshold, or none of the value of the counter C1 related to the write operation and the value of the counter C3 related to the write operation exceeds the corresponding threshold.

As described above, according to this embodiment, in response to completion of processing of a certain I/O command, the controller 4 calculates the number of I/O commands processed per unit time and the amount of transfer data per unit time. While at least one of a condition that the calculated number of I/O commands processed per unit time exceeds the second threshold or a condition that the calculated amount of transfer data per unit time exceeds the first threshold is satisfied, the controller 4 does not transmit a completion response indicating completion of the I/O command to the host 2. The host 2 recognizes that the time required for processing the I/O command takes longer. As a result, the host 2 determines that the host 2 cannot execute the I/O access according to the assumed schedule, and thus issuance of a new I/O command by the host 2 can be suppressed. Therefore, the operation of delaying the timing of transmitting the completion response to the host 2 enables adjustment and control of the quality of service regarding the I/O access performance that can be provided to the host 2.

Note that, although an example of calculating both the number of I/O commands processed per unit time and the amount of transfer data per unit time has been described here, transmission of a completion response or an interrupt to the host 2 may be controlled in consideration of only the amount of transfer data per unit time. In this case, in response to completion of the processing of the first I/O command, the controller 4 calculates the amount of transfer data per unit time transferred between the host 2 and the controller 4 in accordance with each of the I/O commands including the first I/O command processed per unit time. When the calculated amount of transfer data per unit time is equal to or less than the first threshold, the controller 4 transmits a completion response indicating completion of the first I/O command to the host 2. While the calculated amount of transfer data per unit time exceeds the first threshold, the controller 4 does not transmit the completion response indicating the completion of the first I/O command to the host 2. Also in this configuration, issuance of a new I/O command by the host 2 can be suppressed. Therefore, the operation of delaying the timing of transmitting the completion response to the host 2 based on the amount of transfer data per unit time enables adjustment and control of the quality of service regarding the I/O access performance that can be provided to the host 2.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile memory; and
a controller electrically connected to the nonvolatile memory and configured to execute a data read operation or a data write operation for the nonvolatile memory by processing input/output (I/O) commands received from a host, wherein
the controller is configured to:
in response to completion of processing of a first I/O command,
calculate an amount of transferred data per unit time, the amount of the transferred data per unit time being an amount of data which are transferred between the host and the controller according to I/O commands processed per unit time, the I/O commands processed per unit time including the first I/O command;
while the calculated amount of transferred data per unit time exceeds a first threshold, not transmit, to the host, a completion response indicating completion of the first I/O command; and
when the calculated amount of transferred data per unit time is equal to or less than the first threshold, transmit, to the host, the completion response indicating the completion of the first I/O command.

2. The memory system according to claim 1, wherein the controller is further configured to:
in response to the completion of processing of the first I/O command,
calculate the number of the I/O commands processed per unit time, the I/O commands processed per unit time including the first I/O command;
while at least one of a condition that the calculated amount of transferred data per unit time exceeds the first threshold or a condition that the calculated number of the I/O commands processed per unit time exceeds a second threshold is satisfied, not transmit, to the host, the completion response indicating the completion of the first I/O command; and
when the calculated amount of transferred data per unit time is equal to or less than the first threshold and the calculated number of the I/O commands processed per unit time is equal to or less than the second threshold, transmit, to the host, the completion response indicating the completion of the first I/O command.

3. The memory system according to claim 2, wherein the controller is configured to:
in response to the completion of processing of the first I/O command,
calculate, when a type of the first I/O command is a read command, the number of read commands processed per unit time and an amount of transferred data per unit time related to a read operation, the amount of the transferred data per unit time related to the read operation being an amount of data which are transferred between the host and the controller according to the read commands processed per unit time;
while at least one of a first condition that the calculated number of read commands processed per unit time exceeds a third threshold or a second condition that the calculated amount of transferred data per unit time related to the read operation exceeds a fourth threshold is satisfied, not transmit, to the host, the completion response indicating the completion of the first I/O command; and
when the calculated number of read commands processed per unit time is equal to or less than the third threshold and the calculated amount of transferred data per unit time related to the read operation is equal to or less than the fourth threshold, transmit, to the host, the completion response indicating the completion of the first I/O command.

4. The memory system according to claim 3, wherein the controller is configured to:
in response to the completion of processing of the first I/O command,
calculate, when a type of the first I/O command is a write command, the number of write commands processed per unit time and an amount of transferred data per unit time related to a write operation, the amount of the transferred data per unit time related to the write operation being an amount of data which are transferred between the host and the controller according the write commands processed per unit time;
while at least one of a third condition that the calculated number of write commands processed per unit time exceeds a fifth threshold or a fourth condition that the calculated amount of transferred data per unit time related to the write operation exceeds a sixth threshold is satisfied, not transmit, to the host, the completion response indicating the completion of the first I/O command; and
when the calculated number of write commands processed per unit time is equal to or less than the fifth threshold and the calculated amount of transferred data per unit time related to the write operation is equal to or less than the sixth threshold, transmit, to the host, the completion response indicating the completion of the first I/O command.

5. The memory system according to claim 4, wherein the controller is further configured to:
determine, when fetching a new command from the host, whether a fetch pause condition is satisfied, the fetch pause condition being that (A) at least one of the first condition or the second condition is satisfied and (B) at least one of the third condition or the fourth condition is satisfied;
while the fetch pause condition is satisfied, not fetch the new command from the host; and
when the fetch pause condition is not satisfied, fetch the new command from the host.

6. The memory system according to claim 2, wherein the controller is configured to:
calculate the amount of the transferred data per unit time by using a first counter value indicating an accumulated value of sizes of data respectively associated with the I/O commands processed per unit time; and
calculate the number of the I/O commands processed per unit time by using a second counter value indicating the number of the I/O commands processed per unit time.

7. The memory system according to claim 6, wherein the controller is configured to:
decrement the first counter value by a first value every time a first time elapses, such that a sum of decremented values of the first counter per unit time is equal to the first threshold; and
decrement the second counter value by a second value every time a second time elapses, such that a sum of decremented values of the second counter per unit time is equal to the second threshold.

8. The memory system according to claim 1, wherein the memory system is configured to be shared by a plurality of hosts including at least a first host and a second host, and
the controller is configured to:
in response to completion of processing of a second I/O command received from the first host,
calculate, for the first host, the number of I/O commands processed per unit time, the I/O commands processed per unit time for the first host including the second I/O command;
calculate, for the first host, an amount of transferred data per unit time, the amount of transferred data per unit time for the first host being an amount of data which are transferred between the first host and the controller per unit time;
while at least one of a condition that the calculated number of I/O commands processed per unit time for the first host exceeds a second threshold corresponding to the first host or a condition that the calculated amount of transferred data per unit time for the first host exceeds a first threshold corresponding to the first host is satisfied, not transmit, to the first host, a completion response indicating completion of the second I/O command; and
when the calculated number of I/O commands processed per unit time for the first host is equal to or less than the second threshold corresponding to the first host and the calculated amount of transferred data per unit time for the first host is equal to or less than the first threshold corresponding to the first host, transmit, to the first host, the completion response indicating the completion of the second I/O command.

9. The memory system according to claim 8, wherein the controller is configured to:
in response to completion of processing of a third I/O command received from the second host,
calculate, for the second host, the number of I/O commands processed per unit time, the I/O commands processed per unit time for the second host including the third I/O command;
calculate, for the second host, an amount of transferred data per unit time, the amount of transferred data per unit time for the second host being an amount of data which are transferred between the second host and the controller per unit time;
while at least one of a condition that the calculated number of I/O commands processed per unit time for the second host exceeds a second threshold corresponding to the second host or a condition that the calculated amount of transferred data per unit time for the second host exceeds a first threshold corresponding to the second host is satisfied, not transmit, to the second host, a completion response indicating completion of the third I/O command; and
when the calculated number of I/O commands processed per unit time for the second host is equal to or less than the second threshold corresponding to the second host and the calculated amount of transferred data per unit time for the second host is equal to or less than the first threshold corresponding to the second host, transmit, to the second host, the completion response indicating the completion of the third I/O command.

10. A memory system comprising:
a nonvolatile memory; and
a controller electrically connected to the nonvolatile memory and configured to execute a data read operation or a data write operation for the nonvolatile memory by processing input/output (I/O) commands received from a host, wherein
the controller is configured to:
in response to completion of processing of a first I/O command,
transmit, to the host, a completion response indicating completion of the first I/O command;
calculate an amount of transferred data per unit time, the amount of transferred data per unit time being an amount of data which are transferred between the host and the controller according to I/O commands processed per unit time, the I/O commands processed per unit time including the first I/O command;
while the calculated amount of transferred data per unit time exceeds a first threshold, not transmit, to the host, an interrupt for notifying the host that a new completion response has been transmitted to the host; and
when the calculated amount of transferred data per unit time is equal to or less than the first threshold, transmit the interrupt to the host.

11. The memory system according to claim 10, wherein the controller is further configured to:
in response to the completion of processing of the first I/O command,
calculate the number of the I/O commands processed per unit time, the I/O commands processed per unit time including the first I/O command;
while at least one of a first condition that the calculated amount of transferred data per unit time exceeds the first threshold or a second condition that the calculated number of the I/O commands processed per unit time exceeds a second threshold is satisfied, not transmit the interrupt to the host; and when the calculated amount of transferred data per unit time is equal to or less than the first threshold and the calculated number of the I/O commands processed per unit time is equal to or less than the second threshold, transmit the interrupt to the host.

12. The memory system according to claim 11, wherein the controller is configured to:

when at least one of the first condition or the second condition is satisfied, not transmit the interrupt to the host; and after neither the first condition nor the second condition is satisfied, transmit the interrupt to the host.

13. The memory system according to claim 11, wherein the controller is configured to:

in response to the completion of processing of the first I/O command, transmit, to the host, the completion response indicating the completion of the first I/O command;

calculate, when a type of the first I/O command is a read command, the number of read commands processed per unit time and an amount of transferred data per unit time related to a read operation, the amount of the transferred data per unit time related to the read operation being an amount of data which are transferred between the host and the controller according to the read commands processed per unit time;

while at least one of a third condition that the calculated number of read commands processed per unit time exceeds a third threshold or a fourth condition that the calculated amount of transferred data per unit time related to the read operation exceeds a fourth threshold is satisfied, not transmit the interrupt to the host; and when the calculated number of read commands processed per unit time is equal to or less than the third threshold and the calculated amount of transferred data per unit time related to the read operation is equal to or less than the fourth threshold, transmit the interrupt to the host.

14. The memory system according to claim 13, wherein the controller is configured to:

in response to the completion of processing of the first I/O command, calculate, when a type of the first I/O command is a write command, the number of write commands processed per unit time and an amount of transferred data per unit time related to a write operation, an amount of transferred data per unit time related to the write operation being an amount of data transferred between the host and the controller according to the write commands processed per unit time;

while at least one of a fifth condition that the calculated number of write commands processed per unit time exceeds a fifth threshold or a sixth condition that the calculated amount of transferred data per unit time related to the write operation exceeds a sixth threshold is satisfied, not transmit the interrupt to the host; and when the calculated number of write commands processed per unit time is equal to or less than the fifth threshold and the calculated amount of transferred data per unit time related to the write operation is equal to or less than the sixth threshold, transmit the interrupt to the host.

15. The memory system according to claim 14, wherein the controller is further configured to:

determine, when fetching a new command from the host, whether a fetch pause condition is satisfied, the fetch pause condition being that (A) at least one of the third condition or the fourth condition is satisfied and (B) at least one of the fifth condition or the sixth condition is satisfied;

while the fetch pause condition is satisfied, not fetch the new command from the host; and when the fetch pause condition is not satisfied, fetch the new command from the host.

16. The memory system according to claim 11, wherein the controller is configured to:

calculate the amount of the transferred data per unit time by using a first counter value indicating an accumulated value of sizes of data respectively associated with the I/O commands processed per unit time; and calculate the number of the I/O commands processed per unit time by using a second counter value indicating the number of the I/O commands processed per unit time.

17. The memory system according to claim 16, wherein the controller is configured to:

decrement the first counter value by a first value every time a first time elapses, such that a sum of values decremented values of the first counter per unit time is equal to the first threshold; and decrement the second counter value by a second value every time a second time elapses, such that a sum of decremented values of the second counter per unit time is equal to the second threshold.

18. The memory system according to claim 11, wherein the memory system is configured to be shared by a plurality of hosts including at least a first host and a second host, and the controller is configured to:

in response to completion of processing of a second I/O command received from the first host, transmit, to the first host, a completion response indicating completion of the second I/O command;

calculate, for the first host, the number of I/O commands processed per unit time, the number of I/O commands processed per unit time for the first host including the second I/O command;

calculate, for the first host, an amount of transferred data per unit time, the amount of transferred data per unit time for the first host being an amount of data which are transferred between the first host and the controller per unit time;

while at least one of a condition that the calculated number of I/O commands processed per unit time for the first host exceeds a second threshold corresponding to the first host or a condition that the calculated amount of transferred data per unit time for the first host exceeds a first threshold corresponding to the first host is satisfied, not transmit, to the first host, an interrupt for notifying the first host that a new completion response has been transmitted to the first host; and when the calculated number of I/O commands processed per unit time for the first host is equal to or less than the second threshold corresponding to the first host and the calculated amount of transferred data per unit time for the first host is equal to or less than the first threshold corresponding to the first host, transmit the interrupt to the host.

19. The memory system according to claim 18, wherein the controller is configured to:

in response to completion of processing of a third I/O command received from the second host,
- transmit, to the second host, a completion response indicating completion of the third I/O command;
- calculate, for the second host, the number of I/O commands processed per unit time, the number of I/O commands processed per unit time for the second host including the third I/O command;
- calculate, for the second host, an amount of transferred data per unit time, the amount of transferred data per unit time for the second host being an amount of data which are transferred between the second host and the controller per unit time;
- while at least one of a condition that the calculated number of I/O commands processed per unit time for the second host exceeds a second threshold corresponding to the second host or a condition that the calculated amount of transferred data per unit time for the second host exceeds a first threshold corresponding to the second host is satisfied, not transmit, to the host, an interrupt for notifying the second host that a new completion response has been transmitted to the second host; and
- when the calculated number of I/O commands processed per unit time for the second host is equal to or less than the second threshold corresponding to the second host and the calculated amount of transferred data per unit time for the second host is equal to or less than the first threshold corresponding to the second host, transmit the interrupt to the second host.

* * * * *